(12) United States Patent
Wadley et al.

(10) Patent No.: US 10,134,070 B2
(45) Date of Patent: Nov. 20, 2018

(54) CONTEXTUALIZED USER RECAPTURE SYSTEM

(71) Applicant: Bank of America Corporation, Charlotte, NC (US)

(72) Inventors: Cameron Wadley, Waxhaw, NC (US); Jiyoung Choi, Chicago, IL (US); Hamid Dalglijli, Chicago, IL (US); Thomas H. Judge, Chicago, IL (US); Britton T. Farrell, Chicago, IL (US); Katherine Dintenfass, Lincoln, RI (US); Craig Terrill, Barrington Hills, IL (US); Susan Varghese, Atlanta, GA (US); Minh Vuong, Clovis, CA (US)

(73) Assignee: Bank of America Corporation, Charlotte, NC (US)

( * ) Notice: Subject to any disclaimer, the term of this patent is extended or adjusted under 35 U.S.C. 154(b) by 376 days.

(21) Appl. No.: 15/164,526

(22) Filed: May 25, 2016

(65) Prior Publication Data

US 2017/0345074 A1 Nov. 30, 2017

(51) Int. Cl.
*G06Q 30/00* (2012.01)
*G06Q 30/06* (2012.01)
(Continued)

(52) U.S. Cl.
CPC ... *G06Q 30/0613* (2013.01); *G06F 17/30528* (2013.01); *G06F 17/30554* (2013.01);
(Continued)

(58) Field of Classification Search
CPC .......... G06Q 30/0613; G06F 17/30528; G06F 17/30554; G07F 19/209; G07F 19/206; G07F 19/201; H04L 67/22
(Continued)

(56) References Cited

U.S. PATENT DOCUMENTS

| 5,867,799 A | 2/1999 | Lang et al. |
| 7,069,259 B2 | 6/2006 | Horvitz et al. |

(Continued)

OTHER PUBLICATIONS

Sia, Ka Cheung, "Challenges and opportunities in building personalized online content aggregators", University of California, Los Angeles, ProQuest Dissertations Publishing, 2009. 3364026; extracted from Dialog Search website on Aug. 13, 2018.*

(Continued)

*Primary Examiner* — Yogesh C Garg
(74) *Attorney, Agent, or Firm* — Banner & Witcoff, Ltd.; Michael A. Springs

(57) ABSTRACT

Systems are provided for providing contextualized user recapture solutions. A user interaction contextualization system may receive a notification of a user accessing one of the organization's services via a user device. Responsive to the notification, the user interaction contextualization system may collect and analyze contextual data from various data sources, and real-time and historical user engagement data associated with the user. The user interaction contextualization system may then use the collected data to determine the user's likelihood of abandonment of the organization's services. Based on the likelihood of abandonment, the user interaction contextualization system may initiate one or more user recapture solutions.

20 Claims, 7 Drawing Sheets

(51) Int. Cl.
   *H04L 29/08* (2006.01)
   *G06F 17/30* (2006.01)
   *G07F 19/00* (2006.01)
   *H04L 29/06* (2006.01)

(52) U.S. Cl.
   CPC .......... *G07F 19/201* (2013.01); *G07F 19/206* (2013.01); *G07F 19/209* (2013.01); *H04L 67/02* (2013.01); *H04L 67/12* (2013.01); *H04L 67/18* (2013.01); *H04L 67/22* (2013.01); *H04L 67/2823* (2013.01); *H04L 67/42* (2013.01)

(58) Field of Classification Search
   USPC ...................................................... 705/26.41
   See application file for complete search history.

(56) References Cited

U.S. PATENT DOCUMENTS

| | | | |
|---|---|---|---|
| 7,395,316 B2 | 7/2008 | Ostertag et al. | |
| 7,694,135 B2 | 4/2010 | Rowan et al. | |
| 7,698,190 B2 | 4/2010 | Penkalski et al. | |
| 8,112,332 B1 | 2/2012 | Garcia | |
| 8,214,899 B2 | 7/2012 | Chien | |
| 8,234,194 B2 | 7/2012 | Mele et al. | |
| 8,240,557 B2 | 8/2012 | Fernandes et al. | |
| 8,352,881 B2 | 1/2013 | Champion et al. | |
| 8,417,608 B2 | 4/2013 | Benefield et al. | |
| 8,425,605 B2 | 4/2013 | Zielinski | |
| 8,537,986 B1 | 9/2013 | Cantu, II | |
| 8,596,528 B2 | 12/2013 | Fernandes et al. | |
| 8,606,678 B2 | 12/2013 | Jackowitz et al. | |
| 8,666,836 B2 | 3/2014 | Adams | |
| 8,676,937 B2 | 3/2014 | Rapaport et al. | |
| 8,725,605 B1 | 5/2014 | Plunkett | |
| 8,862,512 B2 | 10/2014 | Joa et al. | |
| 8,881,257 B2 | 11/2014 | Cha et al. | |
| 9,049,259 B2 | 6/2015 | Rathod | |
| 9,053,471 B2 | 6/2015 | Mages et al. | |
| 9,081,580 B2 | 7/2015 | Gaffney et al. | |
| 9,336,269 B1 | 5/2016 | Smith et al. | |
| 9,396,236 B1* | 7/2016 | Vanderwater | G06F 17/30867 |
| 9,477,969 B2* | 10/2016 | Boerries | G06Q 30/0251 |
| 2008/0222283 A1* | 9/2008 | Ertugrul | G06Q 30/02 709/224 |
| 2010/0161379 A1 | 6/2010 | Bene et al. | |
| 2010/0161467 A1 | 6/2010 | Ageenko et al. | |
| 2011/0016534 A1* | 1/2011 | Jakobsson | G06F 21/316 726/28 |
| 2011/0137776 A1 | 6/2011 | Goad et al. | |
| 2011/0153646 A1 | 6/2011 | Hong et al. | |
| 2013/0073473 A1 | 3/2013 | Heath | |
| 2013/0151639 A1 | 6/2013 | Vastardis et al. | |
| 2013/0159115 A1 | 6/2013 | Adams | |
| 2013/0226813 A1 | 8/2013 | Voltz | |
| 2013/0290198 A1 | 10/2013 | Vassil | |
| 2013/0340086 A1* | 12/2013 | Blom | G06F 21/6245 726/26 |
| 2014/0136619 A1 | 5/2014 | Hoberman | |
| 2014/0245207 A1 | 8/2014 | Poulin | |
| 2014/0297394 A1 | 10/2014 | Li et al. | |
| 2014/0310142 A1 | 10/2014 | Mak | |
| 2014/0344718 A1 | 11/2014 | Rapaport et al. | |
| 2014/0379272 A1 | 12/2014 | Sathe | |
| 2015/0046325 A1 | 2/2015 | McCracken et al. | |
| 2015/0142595 A1 | 5/2015 | Acuna-Rohter | |
| 2015/0235179 A1 | 8/2015 | Schmidt et al. | |
| 2016/0035039 A1 | 2/2016 | Singh et al. | |
| 2017/0180293 A1* | 6/2017 | Eberbach | H04L 51/16 |
| 2017/0278053 A1 | 9/2017 | High et al. | |
| 2018/0025010 A1* | 1/2018 | Ramer | H04L 67/22 707/727 |

OTHER PUBLICATIONS

Flanders, David et al., "The Advantage of APIs," Jisc, archived Dec 2014, 17 pages; retrieved from https://www.iisc.ac.uk/guides/the-advantage-of-apis.

Jul. 6, 2018—U.S. Non-Final Office Action—U.S. Appl. No. 15/164,501.

Jun. 29, 2018—(U.S.) Notice of Allowance—U.S. Appl. No. 15/164,519.

\* cited by examiner

CONTEXTUALIZED USER RECAPTURE SYSTEM

CROSS-REFERENCE TO RELATED APPLICATIONS

This application is related to U.S. patent application Ser. No. 15/164,501, filed on May 25, 2016, and entitled "System For Providing Contextualized Search Results Of Help Topics," U.S. patent application Ser. No. 15/164,448, filed on May 25, 2016, now U.S. Pat. No. 10,025,933, and entitled "System For Utilizing One Or More Data Sources To Generate A Customized Set Of Operations," U.S. patent application Ser. No. 15/164,472, filed on May 25, 2016, and entitled "System For Utilizing One Or More Data Sources To Generate A Customized Interface," and U.S. patent application Ser. No. 15/164,519, filed on May 25, 2016, and entitled "Network Of Trusted Users," which are hereby incorporated by reference herein in their entirety.

BACKGROUND

Organizations, such as corporate entities, educational institutions, government agencies, and/or other large enterprise organizations, may provide various services. These organizations may maintain large repositories of help topics addressing questions relating to the various services offered by the organizations. Further, these organizations may provide users of these services with the ability to search for help topics. However, using current mechanisms, the results rendered in response to such searches are stateless and not tailored to the user and/or the user devices submitting the search request, causing users to disengage and abandon their sessions. As such, a need has been recognized to provide search results based on contextual data associated with a particular user and/or user device, and to recapture users by providing contextualized interactions.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Some aspects described herein provide a user interaction contextualization system. The user interaction contextualization system may include at least one processor and a communication interface. The user interaction contextualization system may be configured to, in operation, receive a notification from a mobile application installed on a user device, where the user device may be a smartphone. Responsive to the notification, the user interaction contextualization system may collect and analyze contextual data from a plurality of data sources. Further, the user interaction contextualization system may collect and analyze user engagement data associated with the user device. The user interaction contextualization system may determine, based on the contextual data and the user engagement data, a likelihood of abandonment associated with the user device. The user interaction contextualization system may then provide client-side instructions to the mobile application installed on the user device to initiate a user recapture solution based on the likelihood of abandonment.

Additional aspects described herein provide a user interaction contextualization system with at least one processor and a communication interface. The user interaction contextualization system may be configured to, in operation, receive a notification from a user device from a user device, where the user device may be an ATM. A plurality of sensors may be attached to or installed at the ATM. Responsive to the notification, the user interaction contextualization system may collect and analyze contextual data from a plurality of data sources. Further, the user interaction contextualization system may collect and analyze user engagement data from a plurality of data sources, including the sensors attached to or installed at the ATM. The user interaction contextualization system may determine, based on the contextual data and the user engagement data, a likelihood of abandonment associated with the user device. The user interaction contextualization system may then provide client-side instructions to the user device to initiate a user recapture solution based on the likelihood of abandonment.

Additional aspects described herein provide a computer-assisted method of providing contextualized user recapture solutions. A special-purpose computing system may receive a notification from a mobile application installed on a user device, where the user device may be a smartphone. Responsive to the notification, the special-purpose computing system may collect and analyze contextual data from a plurality of data sources. Further, the special-purpose computing system may collect and analyze user engagement data associated with the user device. The special-purpose computing system may determine, based on the contextual data and the user engagement data, a likelihood of abandonment associated with the user device. The special-purpose computing system may then provide client-side instructions to the mobile application installed on the user device to initiate a user recapture solution based on the likelihood of abandonment.

The details of these and other aspects of the disclosure are set forth in the accompanying drawings and description below. Other features and advantages of the disclosure will be apparent from the drawings and description.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1:
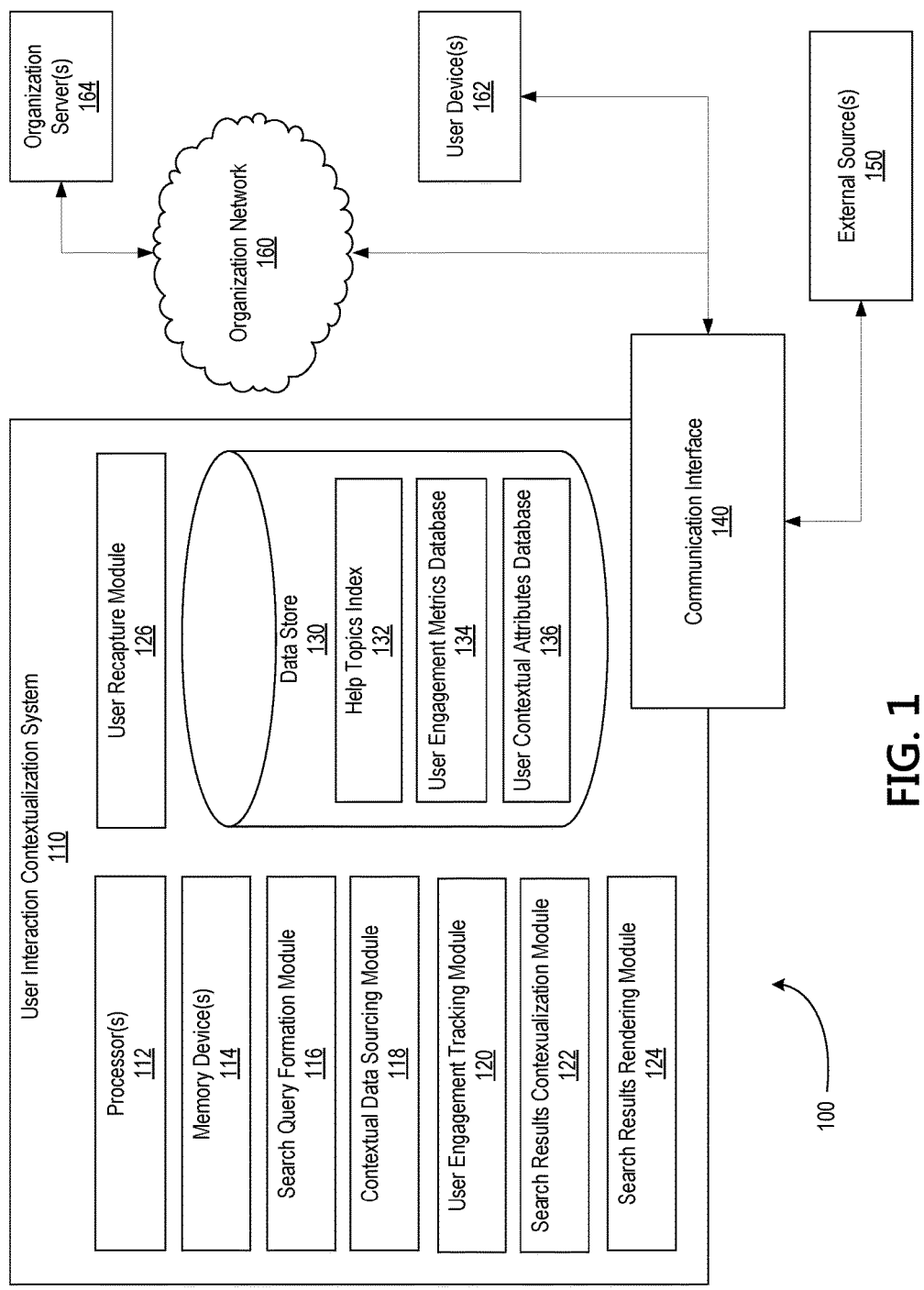
FIG. 1 is an illustrative computing environment including an example user interaction contextualization system in accordance with one or more aspects described herein.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As discussed herein, entities, such as corporations, governments, universities, and the like, may maintain large repositories of help topics addressing questions relating to various services offered by the entities. Further, the entities may enable users of these services to search for help topics. However, under current mechanisms, the search results rendered in response to a user's search request are stateless and not tailored to the user. As such, users submitting search requests with the same search terms, but with different needs and/or preferences, may be presented with the same set of search results. Given this inflexibility, users may abandon their search and/or the organizations website/application, or otherwise disengage from the organization's services. Accordingly, the devices, systems, and methods described herein may relate to systems and methods of providing contextualized search results and reengaging users using historical and real-time data gathered from internal and external sources.

Aspects of the present disclosure are directed at a user interaction contextualization system, where the user interaction contextualization system is configured to analyze contextual data and engagement tracking data relating to a user, and apply the analysis to provide contextualized search results and user recapture solutions. In some examples, the user interaction contextualization system of an organization may receive a search request for help topics from a user, responsive to which the user interaction contextualization system may first retrieve an uncontextualized set of help topics from a help topics index, where the help topics included in the uncontextualized set may be in order of relevance to the search request. Further, the user interaction contextualization system may collect contextual data from various internal data sources (e.g., data maintained by the organization, and the like), external data sources (e.g., data maintained by social media channels, and the like), user devices (e.g., a smartphone, a wearable device, and the like), and/or web page tracking mechanisms. The data gathered from these various sources may be analyzed to determine real-time and/or historical user behavior/preferences (e.g., types of help topics recently and/or typically viewed by the user, types of help topics recently and/or typically viewed by similar users, and the like), and may also be used to determine recent or upcoming life events (e.g., graduation, new job, new home, marriage, birth of a child, divorce, death in the family, or other event that has changed or may change the user's status or circumstances). The user interaction contextualization system may then generate a contextualized set of help topics. In some examples, the contextualized set of help topics may be based on additions, deletions, or modifications to the uncontextualized set of help topics in view of the analysis of the real-time and/or historical user behavior/preferences and recent or upcoming life events.

Additionally or alternatively, the user interaction contextualization system of an organization may receive notification of a user accessing one of the organization's services via a user device. As discussed above, the user interaction contextualization system may collect data from various internal and external data sources, and/or web page tracking mechanisms. The data gathered from these various sources may be analyzed to determine the user's likelihood of abandoning the organization's services. Where there is a likelihood of abandonment, the user interaction contextualization system may initiate one or more user recapture solution.

FIG. 1 shows an illustrative networked computing system 100 for providing contextualized search results of help topics and recapturing user engagement. The networked computing system 100 may include one or more computing devices. For example, the networked computing system 100 may include a user interaction contextualization system 110, and may be configured to communicate with one or more user device(s) 162, one or more organization database(s), one or more organization server(s) 164, and one or more external systems 150 (e.g., social media channels, user devices, and the like), according to one or more aspects of the present disclosure. The user interaction contextualization system 110, described in further detail below, may receive a search request for help topics, retrieve an uncontextualized set of search results, collect and analyze contextual data from internal and external sources, collect and analyze real-time and historical user engagement data, calculate a rank for the search results in the uncontextualized set, generate a contextualized set of search results by applying the calculated ranks to the uncontextualized set, and display the contextualized search results on a user device. The user interaction contextualization system 110 may also receive a notification of a user accessing an organization's services, collect and analyze contextual data from internal and external sources, collect and analyze real-time and historical user engagement data, determine a user's likelihood of abandonment of the organization's services, and initiate user recapture solutions.

The user devices 162 may be any type of computing device configured to provide the functionality described herein. For instance, the user device 162 may be a desktop computer, server computer, laptop computer, tablet computer, smartphone, wearable device, automated teller machine (ATM), or the like. In some examples, the user device 162 may be configured to receive and/or display a user interface, receive input via the user interface, and communicate the received input to one or more other computing devices. As such, the user device 162 may provide a user interface (e.g., a web browser, a desktop application, a mobile application, or the like) that enables the user to submit search requests to, and receive contextualized search results from, the user interaction contextualization system 110. The user device 162 may, in some instances, be a special-purpose computing device configured to perform specific functions.

The user interaction contextualization system 110 may acquire information related to the search request, the user device 162 associated with the search request and/or access notification, and/or the user associated with the search request and/or access notification from one or more internal systems (e.g., systems associated with and/or operated by the organization). In some examples, the internal systems may include the organization servers 164. The organization servers 164 may be any type of computing device configured to provide the functionality described herein. For instance, the organization server 164 may be a database server, a file server, a web server, an application server, or the like. In some examples, the organization server 164 may be configured to communicate with the user interaction contextualization system 110 relating to information stored on the organization server 164. The organization server 164 may store, for example, information relating to one or more services offered by the organization, one or more applications by the organization, and/or one or more users associated with the organization.

Further, the user interaction contextualization system 110 may acquire information related to the search request, the user device 162 associated with the search request and/or access notification, and/or the user associated with the search request and/or access notification from one or more external systems 150. For example, the user interaction contextualization system 110 may acquire information from various social media channels (e.g., social media network, social media website, social media messaging system, and the like), fitness trackers, Internet of Things (IoT) devices, and so forth. Additionally or alternatively, the user interaction contextualization system 110 may retrieve results generated by various search systems.

The networked computing system 100 may also include one or more networks, which may interconnect one or more of the user interaction contextualization system 110, the user devices 162, the organization servers 164, and external sources 150. Thus, the user interaction contextualization system 110 may be in signal communication with the user devices 162, the organization servers 164, and the external sources 150 via a network. The networks may include one or more of a wired network (e.g., the Internet, LAN, WAN, or the like), a wireless network (e.g., a cellular network, Bluetooth, NFC, or the like), or a combination of wired or wireless networks.

In some examples, the networked computing system 100 may include an organization network 160. The organization network 160 may include one or more sub-networks (e.g., LANs, WANS, or the like). The organization network 160 may be associated with a particular organization (e.g., a corporation, enterprise organization, educational institution, governmental institution, and the like) and may interconnect one or more computing devices associated with the organization. For example, the user interaction contextualization system 110 and organization servers 164 may be associated with an organization (e.g., an enterprise organization), and an organization network 160 may be associated with and/or operated by the organization, and may include one or more networks (e.g., the Internet, LANs, WANs, VPNs, or the like) that interconnect the user interaction contextualization system 110, organization servers 164, and one or more other computing devices and/or computer systems that are used by, operated by, and/or otherwise associated with the organization.

FIG. 1 also shows an example implementation of a user interaction contextualization system 110. The user interaction contextualization system 110 may include various components, modules, and sub-modules that facilitate various tasks, including receiving search requests, retrieving an uncontextualized set of search results, collecting and analyzing contextual data, collecting and analyzing real-time and historical user engagement data, calculating a rank for the search results in the uncontextualized set, generating a contextualized set of search results by applying the calculated ranks to the uncontextualized set, and displaying the contextualized set of search results. Additionally or alternatively, the user interaction contextualization system 110 may include various components, modules, and sub-modules that further facilitate receiving a notification of a user accessing an organization's services, collecting and analyzing contextual data from internal and external sources, collecting and analyzing real-time and historical user engagement data, determining a user's likelihood of abandonment of the organization's services, and initiating user recapture solutions. It will be appreciated that the user interaction contextualization system 110 illustrated in FIG. 1 is shown by way of example and that other implementations of a user interaction contextualization system 110 may include additional or alternative components, modules, sub-modules, and so forth. In this example, the user interaction contextualization system 110 includes one or more processors 112, one or more memory devices 114, a communication interface 140, a search query formation module 116, a contextual data sourcing module 118, a user engagement tracking module 120, a search results contextualization module 122, a search results rendering module 124, a user recapture module 126, and a data store 130. Also, in this example, the data store 130 includes a help topics index 132, a user engagement metrics database 134, and a user contextual attributes database 136. Thus, the user interaction contextualization system 110 may be implemented using a special-purpose computing device (or computing devices) that have been specially programmed to perform functionality according to one or more aspects of the present disclosure.

The one or more processors 112 (e.g., microprocessor, microcontroller, and the like) of the user interaction contextualization system 110 may operate by using an algorithm that facilitates receiving search requests, retrieving an uncontextualized set of search results, collecting and analyzing contextual data, collecting and analyzing real-time and historical user engagement data, calculating a rank for the search results in the uncontextualized set, generating a contextualized set of search results by applying the calculated ranks to the uncontextualized set, and displaying the contextualized set of search results. Additionally or alternatively, the one or more processors 112 may operate by using an algorithm that facilitates receiving a notification of a user accessing an organization's services, collecting and analyzing contextual data from internal and external sources, collecting and analyzing real-time and historical user engagement data, determining a user's likelihood of abandonment of the organization's services, and initiating user recapture solutions. These algorithms may be included as instructions stored in the one or more memory devices 114 and may be included as a portion of the search query formation module 116, the contextual data sourcing module 118, the user engagement tracking module 120, the search results contextualization module 122, the search results rendering module 124, and/or the user recapture module 126. Additionally, the one or more processors 112 may operate by receiving information from the one or more external sources 150. An illustrative algorithm will be described below with reference to FIG. 2.

In this example, the one or more processors 112 may be configured to operate the algorithm, the search query formation module 116, the contextual data sourcing module 118, the user engagement tracking module 120, the search results contextualization module 122, the search results rendering module 124, and/or the user recapture module 126 using an operating system (e.g., a proprietary operating system, an open source operating system, an embedded operating system, and/or the like). In some cases, the one or more memory devices 114 may be communicatively coupled to the one or more processors 112, such as via a data bus. The one or more memory devices 114 may be used to store any desired information, such as the aforementioned algorithm, a lookup table, computer-executable instructions to implement the generation of contextualized search results, and/or the like. The one or more memory devices 114 may be any suitable storage, including, but not limited to RAM, ROM, EPROM, flash memory, a hard drive, and so forth. In some examples, the one or more processors 112 may store information within and/or may retrieve information from the one or more memory devices 114.

The communication interface 140 of the user interaction contextualization system 110 may facilitate communication between the user interaction contextualization system 110, the external sources 150, the user device 162, and/or the organization servers 164 via a network using one or more wired or wireless communication links. In some examples, the user interaction contextualization system 110 may include one or more computing devices that may be communicatively coupled to a network. The network may be communicatively coupled to one or more devices, such as to servers associated with the external sources 150, the user device 162, and/or the organization servers 164. The network may include one or more wired and/or wireless networks, such as a telecommunications network (e.g., a cellular network, a land line network, a cable network, and the like), a Wi-Fi network, a local area network (LAN), a wide area network (WAN), the Internet, and the like. When used in a LAN networking environment, the user interaction contextualization system 110 may include a modem and/or other means for establishing wired and/or wireless communication over the WAN, such as the Internet. It will be appreciated that the network connections discussed herein are illustrative and other means of establishing communication links between the user interaction contextualization system 110, the external sources 150, the user device 162, and/or the organization servers 164 may include one or more various protocols such as TCP/IP, Ethernet, FTP, HTTP, and so forth.

The data store 130 of the user interaction contextualization system 110 may be used to store information related to help topics and users (e.g., previous and current users of the organization's services). For example, the data store 130 may be used to store information related to the help topics addressing questions relating to the various services offered by the organizations. Further, the data store 130 may be used to store information related to user behavior determined by tracking/monitoring a user's activity while interacting with the organization's services. In some examples, the data store 130 may include a help topics index 132, a user engagement metrics database 134, and a user contextual attributes database 136. The user interaction contextualization system 110 may utilize these databases to retrieve an uncontextualized set of search results, to collect historical and current user engagement data, and to generate a contextualized set of search results.

The help topics index 132 may store information associated with one or more help topics maintained by the organization, e.g., a help topic ID, a title (e.g., text, graphics, audio, video, mixed media, and the like), a type, contents, one or more categories/subjects, one or more meta tags, a date created, an author, a length (e.g., a number of characters in the content, a file size, an average page load time, and the like), a user helpfulness rating, a click-through rating (e.g., a ratio of the number of users that clicked on a particular help topic when it is included in the search results, over the number of users for whom the particular help topic was included in the search results), and so forth. In some examples, the help topics index 132 that associates a help topic with one or more categories, the help topics index 132 may additionally maintain a hierarchical tree of the categories. As such, the help topics index 132 may differentiate help topics associated with high-level categories (e.g., more general help topics) from help topics associated with low-level categories (e.g., more specific help topics). For instance, an example high-level category may be Banking, and an example low-level category may be Personal Credit Cards. Further, the help topics index 132 may associate one or more meta tags to a help topic, where the meta tags may be unique terms that appear in the content of a help topic. In some examples, some or all of the meta tags associated with a help topic may be the same as some or all of the categories/subjects associated with the help topic. In examples where a help topic is assigned one or more meta tags, the user interaction contextualization system 110 may retrieve the uncontextualized set of search results from the help topics index 132 by matching the user's search terms with the meta tags. As such, some or all of the help topics associated with meta tags matching one or more of the search terms will be added to the uncontextualized set of search results. It will be appreciated that one or more of these fields may be designated as mandatory or optional in some example implementations of a user interaction contextualization system 110.

The user engagement metrics database 134 may store information related to a current or previous users' interactions with the organization's services. The user engagement metrics database 134 may track information relating to interactions via various channels, including mobile devices, desktops, laptops, ATMs, wearable devices, and so forth. As such, the user engagement metrics database 134 may track information relating to users accessing an organization's services via a mobile application, a mobile browser, a desktop application, a desktop browser, a wearable device application, and so forth. In some examples, the user engagement metrics database 134 may store metrics associated with a user's interaction with some or all pages associated with the organization. In other examples, the user engagement metrics database 134 may store metrics associated with a user's interaction with some or all help topics provided by the organization. Further, the user engagement metrics database 134 may store metrics associated with a specific page and/or help topic, as well as aggregate metrics associated with a plurality of pages or help topics. For instance, the user engagement metrics database 134 may store a user ID, a username, browser(s) used to access organization's services, language(s) used to access organization's services, computing device(s) used to access organization's services (e.g., a smartphone, a laptop, a tablet, a wearable device, and so forth), screen resolution(s) used to access organization's services, location(s) (e.g., an address, a coordinate, or a generic description, such as coffee shop or home, and so forth) and/or IP address(es) from which organization's services were accessed, network speed(s), a number of times the user has accessed a particular page, a number of times the user accesses the same pages from different devices, the date(s) and time(s) at which the user accessed pages, the page(s) which the user has accessed, the referring page(s) (e.g., the pages the user was on before coming to the current page), help topic(s) (e.g., help topic ID(s)) previously viewed by the user, average number of help topic(s) viewed/clicked in one set of search results, average time spent on a page, average time spent reading a help topic, minimum/average/maximum number of concurrent tabs accessing the organization's services, minimum/average/maximum time spent on page(s), number of single-page visits, time elapsed since last interaction with the current page, and so forth. Additionally, in some cases, some or all user engagement metrics stored in the user engagement metrics database 134 may be associated with one or more life events identified by the user interaction contextualization system 110 based on contextual data received from the external sources 150. Further, in some examples, the user engagement metrics database may maintain historical values of user engagement data (e.g., user engagement with contextualized set of results), such that the user interaction contextualization system 110 may provide more contextually relevant help topics to a user based on this historical data.

The user contextual attributes database 136 may store information related to contextual data relating to a user retrieved from a various data sources. Examples of contextual data may include a user's current location, recent or upcoming life events, user's relationship status, a user's history with the organization, user's employment history, and so forth. The user contextual attributes database 136 may store contextual data attributes according to the most recent update. For example, the user contextual attributes database 136 may initially store a first user's current location. Following an update to the user's location, the user contextual attributes database 136 may be updated to store a second user's current location. In other examples, the user contextual attributes database 136 may maintain historical values of the contextual data attributes. For instance, following an update to the user's employment status, the user contextual attributes database 136 may be appending to include the most recent employment status, such that the user contextual attributes database 136 maintains a history of the user's employment statuses.

Additionally, in some cases, the data store 130 may be used to store computer-executable instructions to cause a computing device (e.g., the search query formation module 116, the contextual data sourcing module 118, the user engagement tracking module 120, the search results contextualization module 122, the search results rendering module 124, and/or the user recapture module 126) to facilitate receiving search requests, retrieving an uncontextualized set of search results, collecting and analyzing contextual data, collecting and analyzing real-time and historical user engagement data, calculating a rank for the search results in the uncontextualized set, generating a contextualized set of search results by applying the calculated ranks to the uncontextualized set, and displaying the contextualized set of search results. Similarly, in other examples, the data store 130 may be used to store computer-readable instructions to cause a computing device to facilitate receiving a notification of a user accessing an organization's services, collecting and analyzing contextual data from internal and external sources, collecting and analyzing real-time and historical user engagement data, determining a user's likelihood of abandonment of the organization's services, and initiating user recapture solutions.

In some examples, the user interaction contextualization system 110 may provide an API whereby various systems in the organization's network have access (e.g., read access, read/write access, and the like) to the data store 130. As such, the contextual data and user engagement data collected and stored by the user interaction contextualization system 110 may be available for use across all channels and services offered by the organization. The data may thus be used to provide contextualized services for users across all channels and services.

Figure 2:
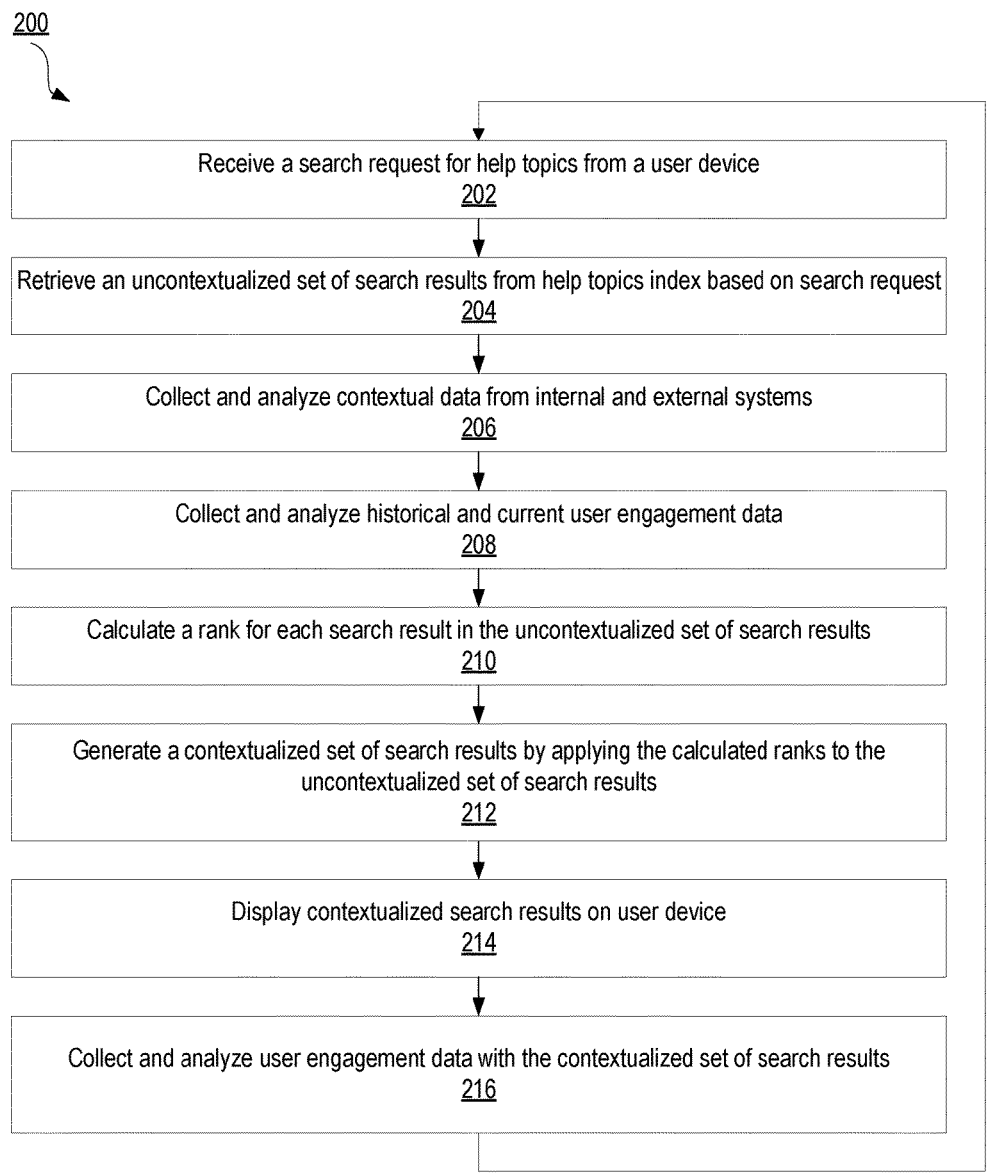
FIG. 2 is a flowchart of an illustrative method for generating and displaying contextualized search results in a networked computing system in accordance with one or more aspects described herein.

Referring now to FIG. 2, a flowchart 200 of example steps for generating and displaying contextualized search results is shown. The various components of the user interaction contextualization system 110 may be used to perform these method steps. In this example, in step 202, the user interaction contextualization system 110 may receive a search request for help topics from a user device 162. The search request may include one or more search term. Further, in some examples, the search request may include one or more connectors (e.g., OR, AND, NOT, and the like) and/or one or more special characters (e.g., ! for truncation, * for wildcard, and the like). Based on the search request, the search query formation module 116 of the user interaction contextualization system 110 may generate a search query. In some cases, the search query may be a database query (e.g., a SQL query) that can be executed against the help topics index 132.

Accordingly, in step 204, the search query formation module 116 may execute the generated search query against the help topics index 132 to retrieve an uncontextualized set of search results. In some examples, the uncontextualized set of search results may include all help topics returned by the search query. In other examples, the uncontextualized set of search results may include only some of the help topics returned by the search query. For instance, the search query formation module 116 may limit the number of help topics (e.g., maximum of 50 help topics, and the like) to include in the uncontextualized set of search results. In another example, the search query formation module 116 may calculate a relevance score for each of the help topics returned by the search query, and select those help topics with a relevance score above a threshold relevance score to be included in the uncontextualized set of search results. Further, the search query formation module 116 may order the uncontextualized set of search results based on the relevance scores (e.g., highest relevance score to lowest relevance score). The relevance score may represent a level to which the meta tags associated with a help topic and/or the full-text content of the help topic match with the one or more search terms of the search request. For instance, the relevance score may be based on a term frequency score. The term frequency score may represent how often one or more search terms appear in the meta tags and/or the full-text content of the help topic. As such, a help topic having more occurrences of a search term will have a higher term frequency score than a help topic having fewer occurrences of the search term. In some examples, a term frequency score may be weighted based on one or more factors, such as an inverse document frequency and/or a field-length norm. The inverse document frequency score may represent how often a search term appears in a database (e.g., the help topic index 132). As such, a term frequency score associated with a popular search term is carries less weight than a term frequency score associated with an uncommon search term. The field-length norm score may represent the length of the full-text content of a help topic. As such, a term frequency score associated with a search term that appears in a help topic with shorter content carries more weight than a term frequency score associated with a help topic with longer content.

It will be appreciated that the process described above may be configured such that the search query formation module 116 may order the uncontextualized set of search results based on other non-contextual factors, such as date created (e.g., most recently created to least recently created), alphabetically (e.g., A-Z by title of help topic, Z-A by title of help topic, and the like), by user rating (highest user rating to lowest user rating), and so forth. In other examples, the search query formation module 116 may maintain the order of the help topics as retrieved from the help topics index 132. In some cases, it may be technologically advantageous to delay the ordering of the help topics, such that the ordering is only performed one time based on a combination of contextual and non-contextual factors. The ordering based on contextual factors will be discussed in further detail below with reference to the search results contextualization module 122.

Once an uncontextualized set of search results are retrieved, in step 206, the contextual data sourcing module 118 may collect contextual data from one or more internal sources (e.g., organization servers 164, and the like), one or more external sources 150 (e.g., search systems, social media channels, and the like), and/or one or more user devices 162. Contextual data may include information relating to a specific user that may be used by the user interaction contextualization system 110 to provide help topics catered to the specific user, rather than providing help topics based on the search request alone. For example, contextual data may include a user's current location, recent or upcoming life events for a user, a user's history with the organization (e.g., length of time user has been a customer with a bank, number of accounts held by the user at a bank), a credit score, an employment history, and the like. It will be appreciated that, in some examples, contextual data may be received directly from an internal or external sources (e.g., a user's location may be received from a user device 162), and in other examples, contextual data may be derived from information received from an internal or external source (e.g., a recent/upcoming life event may be derived based on information received from social media channels). Further, it will be appreciated that the accessibility of the data sources for retrieving contextual data relating to a user may be limited by permissions granted to the contextual data sourcing module 118 (and/or to the user interaction contextualization system 110 at large) by the user.

Figure 3:
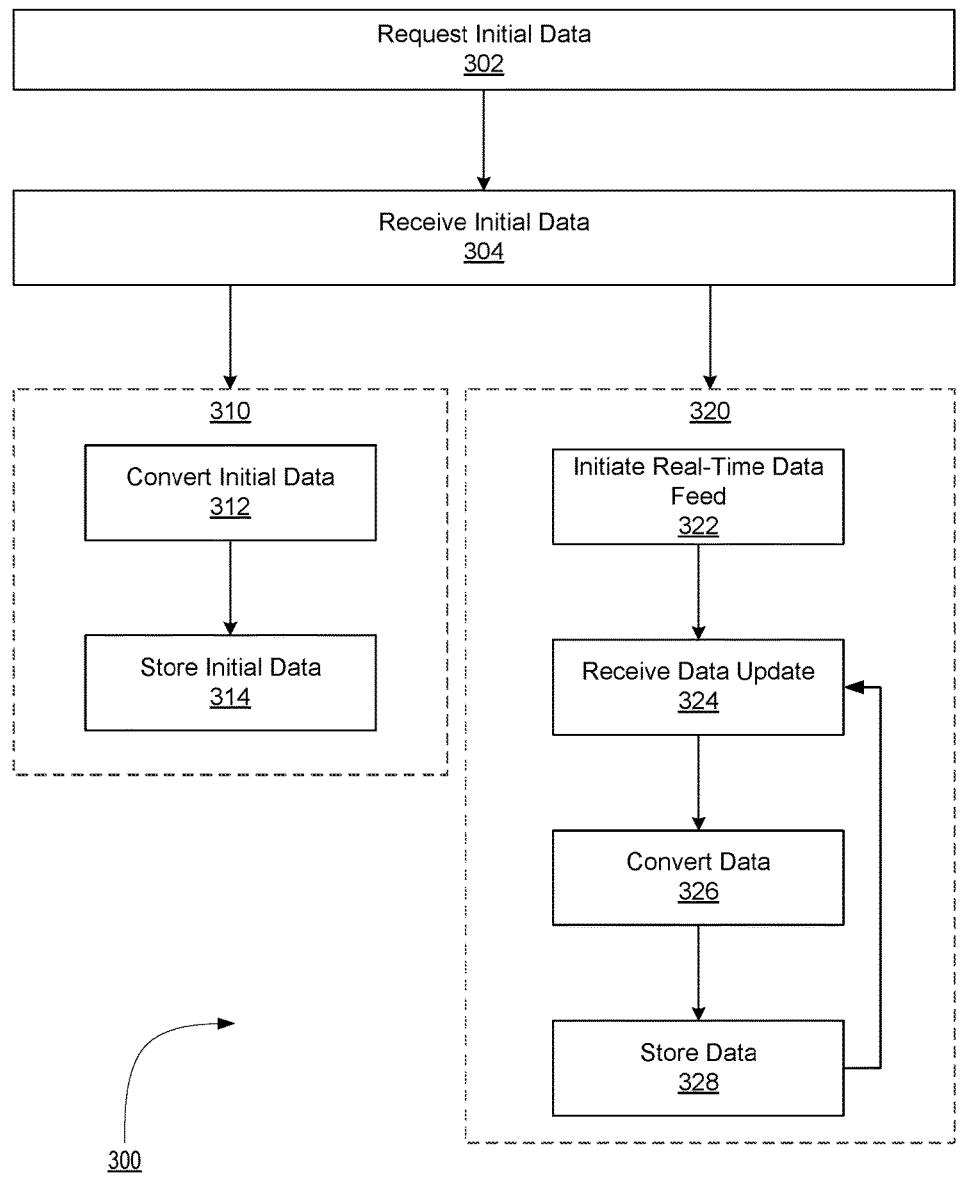
FIG. 3 is a flowchart of an illustrative method for sourcing contextual data in accordance with one or more aspects described herein.

FIG. 3 depicts an example method a contextual data sourcing module 118 may use to retrieve data from internal sources (e.g., the organization servers 164), external sources 150, and/or user devices 162. In some cases, the contextual data sourcing module 118 may include an authentication token in a request for initial data from a data source. As such, the contextual data sourcing module 118 may maintain (or retrieve from the data store 130) authentication tokens for one or more of the data sources. The contents of the authentication token may vary depending on the type of authentication required by the data source to which the request for data is sent.

As described above, the contextual data sourcing module 118 may transmit a request for data to multiple data sources. For example, the contextual data sourcing module 118 may transmit a first request for data associated with a first user to a first source of data, and a second request for data associated with the first user to a second source of data. The contextual data sourcing module 118 may transmit the first and second requests in parallel or sequentially. It will be appreciated that the first and second requests are illustrative, and that a greater number of requests, or a fewer number of requests, may be transmitted by the contextual data sourcing module 118 depending on the number of data sources available for the user.

In some examples, the contextual data sourcing module 118 may generate independent initial requests for data for each data source, such that an initial request for data sent to a data source is property customized and formatted for that data source.

The contextual data sourcing module 118 may send a first initial request for data for a first user to a first data source at step 302. The first data source may be an external data source 150. For instance, the first data source may be a first social media website. The first social media website may allow users to create a user profile. Users of the first social media website may then connect to other users, share posts, photos, videos, and news stories, add life events, exchange private messages, and join various groups. The contextual data sourcing module 118 may send the first initial request data to a first application programming interface (API) provided by the first social media website. The first API may be a HTTP-based API that may be used to query data from the first social networking website. The first API may be comprised of nodes, edges, and fields. The nodes may represent elements of the first social networking website, such as a user or a photo. The edges may represent connections between the nodes, such as comments made on a photo. The fields may represent information about the nodes, such as a user's birthday or gender. The contextual data sourcing module 118 may include access tokens in the first initial request for data. The specific access tokens in the first initial request for data may vary on the type of data that is requested.

The nodes and edges in the first API may be read with an HTTP "Get" request. The first initial request for data made to the first data source sent by the contextual data sourcing module 118 may include a data field identifying the user for which the data is requested. The contextual data sourcing module 118 may further include specific fields or edges within the first initial request for data. For example, the contextual data sourcing module 118 may request one or more of the first customer's ID, age, biography, birthday, a list of iOS and Android devices the customer is using, education, email address, name, gender, hometown, locale, relationship status, significant other, updated time, website, work experience, recent life events, and so forth. In certain instances, the first customer may have configured privacy or permission settings within the first social networking website such as one or more of these fields or edges are not accessible to the contextual data sourcing module 118 via the first API.

The contextual data sourcing module 118 may further send a second initial request for data for the first user to a second data source at step 302. The second data source may be an external data source 150. The second initial request for data may be transmitted simultaneous to or subsequent to the first initial request for data. The second data source may be a second social media website. The second social media website may allow users to create a user profile. Users of the second social media website may then send and read messages. A first user of the second social media website may subscribe or follow other users, such that messages posted by the other users can be viewed by the first user.

The contextual data sourcing module 118 may send the second initial request data to a second API provided by the second social media website. The second API may be a HTTP-based API that may be used to query data from the second social networking website. The second API may be comprised of objects, including, but not limited to, users, messages, entities, and places. Users may be individuals or units that have created a user profile within the second social media website. Messages may be the messages that are posted or shared by users of the second social media website. Places are locations with geographical coordinates that may be associated with a message (e.g., a message may be posted from a place) or the subject of a message (e.g., a message may be posted about a place). Entities provide metadata and additional contextual information about content posted on the second social media website. The contextual data sourcing module 118 may include access tokens in the second initial request for data. The specific access tokens in the second initial request for data may vary on the type of data that is requested.

The objects in the second API may be read with an HTTP "Get" request. Each of the objects may have one or more fields. These fields may also be read by the contextual data sourcing module 118 via an HTTP "Get" request. For example, regarding a "user" object, the contextual data sourcing module 118 may request data for fields including, but not limited to, the date the user's account with the second social media website was created, a user-provided description of the user's account, the accounts being followed by the user, the number of followers of the user's account, whether the user has enabled geotagging of messages, the user's ID, the location associated with the user's account, a user-provided name, a time zone the user declares themselves in, a URL provided by the user in association with their profile, and the like. The second initial request for data made to the second data source sent by the contextual data sourcing module 118 may include a data field identifying the user for which the data is requested. The contextual data sourcing module 118 may further include objects and fields within the second initial request for data. In certain instances, the first user may have configured privacy or permission settings within the second social networking website such as one or more of these objects or fields are not accessible to the contextual data sourcing module 118 via the second API.

The contextual data sourcing module 118 may further send a third initial request for data for the first user to a third data source at step 302. The third data source may be an external data source 150. The third initial request for data may be transmitted simultaneous to or subsequent to one or more of the first initial request for data and the second initial request for data. The third data source may be a third social media website. The third social media website may allow users to create a user profile. The user profile may be directed to the education history of the user, the career history of the user, the user's current employment information, and the user's skills. Users of the third social media website may further exchange messages with other users.

The contextual data sourcing module 118 may send the third initial request data to a third API provided by the third social media website. The third API may be a HTTP-based API that may be used to query data from the third social networking website. The contextual data sourcing module 118 may access, via the third API and for a user of the third social media website, basic profile fields, location fields, and position fields. Basic profile fields for a user of the third social media website may include, but are not limited to, the user's name, physical location, the industry the user belongs to, the most recent item the member has shared on the third social media website, the number of connections the user has on the third social media website, a summary of the user's professional profile, a summary of the user's specialties, the user's current position, and the user's email address. Location fields for a user of the third social media website may include, but are not limited to, a generic user-provided description of the user's location, and a country code representing the user's current country. Position fields for a user of the third social media website may include, but are not limited to, the title of the user's position, a summary of the position, a date indicating when the position began, a date indicating when the position ended, a Boolean value indicating whether the user is currently in this position, and a description of the company the position belongs to.

The contextual data sourcing module 118 may further send a fourth initial request for data to a fourth data source at step 302, where the fourth data source may be one or more databases. The one or more databases may be internal data sources. The one or more databases may store information associated with the first user. The information associated with the first user may include tracking or logging data from the first user's interactions with websites maintained by the enterprise. The first user may interact with the websites maintained by the enterprise via one or more computing devices. For example, the enterprise may provide a digital interface to its users. The digital interface may provide information associated with the user's account(s) with the enterprise. For example, the user may have a checking account and a savings account with the enterprise. The digital interface presented to the user may include information on the user's checking account and savings account. The digital interface may further provide information on other products and services provided by the enterprise. For example, the digital interface may include information on the types of brokerage accounts offered by the enterprise (even though the user may not currently have a brokerage account with the enterprise).

The user's interaction with the digital interface may be tracked and logged. For example, if the user expresses interest in brokerage accounts offered by the enterprise (by clicking on a brokerage account link), that information may be tracked and logged by the digital interface. In another example, if the customer updates account information via the digital interface, the updated information may be tracked and logged by the digital interface. The user's interaction with the digital interface may be tracked across multiple platforms. For example, the user may log onto the digital interface from a first computing device, such as a laptop device. The user may further log onto the digital interface from a second computing device, such as a cellular device. The digital interface may track the user's interaction with the digital interface via both the first computing device and the second computing device. The user's tracking information from the first computing device may be tagged with an identifier identifying the first computing device prior to storage. Similarly, the user's tracking information from the second computing device may be tagged with an identifier identifying the second computing device prior to storage. All tracking information from the digital interface may be logged (e.g., stored) within one or more internal databases maintained by the enterprise. The contextual data sourcing module 118 may send the fourth initial request for data to the one or more databases that stores the logged information for that customer.

The contextual data sourcing module 118 may further send a fifth initial request to a fifth data source at step 302, where the fifth data source may be one or more mobile devices 162 (e.g., a smartphone, a wearable device, and the like). In some examples, the mobile devices may be equipped with a GPS sensor. As such, the contextual data sourcing module 118 may receive device position data from a mobile device. The device position data may provide a coordinate (e.g., latitude and longitude), an altitude, an accuracy (e.g., accuracy of the coordinates, accuracy of the altitude), a heading (e.g., the current direction of travel of the device), and/or a speed (e.g., the current speed of the device). Additionally, the device position data may be coupled with a timestamp.

The contextual data sourcing module 118 may send the fifth initial request data to a fourth API provided by the mobile device. The fourth API may be an HTTP-based API that may be used to query data from the mobile device. The contextual data sourcing module 118 may access, via the fourth API and for a user of the mobile device, device location data. In some examples, the fourth API may allow the contextual data sourcing module 118 to specify a desired accuracy or maximum response time. In examples where the contextual data sourcing module 118 requests high accuracy, the fourth API may provide device location data based on a GPS sensor installed in or attached to the mobile device. In examples where the contextual data sourcing module 118 requests a fast response time, with lowered expectations for accuracy, the fourth API may provide device location data based on cell tower triangulation.

In another example, the contextual data sourcing module 118 may, at step 302, send batch or bulk initial requests for data to the data sources discussed above. That is, in this instance, the contextual data sourcing module 118 may sent a first batch request to the first data source (e.g., the first social media website). The first batch request may be viewed as a plurality of initial requests for data included in a single batch initial request for data. That is, the first batch request may include a first initial request for data for a first user and a second initial request for data for a second user. The contextual data sourcing module 118 may similarly send a second batch request to the second data source (e.g., the second social media website), a third batch request to the third data source (e.g., the third social media website), a fourth batch request to the fourth data source (e.g., the one or more internal databases), and a fifth batch request to the fifth data source (e.g., the one or more mobile devices). The first, second, third, fourth, and fifth batch requests may be transmitted in parallel or sequentially.

At step 304, the contextual data sourcing module 118 may receive initial data in response to the initial requests for data transmitted at step 302. The contextual data sourcing module 118 may receive multiple sets of initial data. Each set of initial data may be received from a different data source.

In some examples, the contextual data sourcing module 118 may receive a first set of initial data from the first data source to which the contextual data sourcing module 118 sent a first initial request for data (e.g., the first social media website). The contextual data sourcing module 118 may receive a second set of initial data from the second data source to which the contextual data sourcing module 118 sent a second initial request for data (e.g., the second social media web site). The contextual data sourcing module 118 may receive a third set of initial data from the third data source to which the contextual data sourcing module 118 sent a third initial request for data (e.g., the third social media website). The contextual data sourcing module 118 may receive a fourth set of initial data from the fourth data source to which the contextual data sourcing module 118 sent the fourth initial request for data. The contextual data sourcing module 118 may receive a fifth set of initial data from the fifth data source to which the contextual data sourcing module 118 sent the fifth initial request for data. The contextual data sourcing module 118 may tag each set of initial data with the data source that sent that set of initial data. The contextual data sourcing module 118 may determine the data source that sent an initial set of data based on the contents of the initial data (e.g., the contents themselves may indicate the data source) or based on the address from which the set of initial data was received.

Further, the contextual data sourcing module 118 may receive a first batch set of initial data from the first data source to which the contextual data sourcing module 118 sent a first batch initial request for data (e.g., the first social media website). The contextual data sourcing module 118 may receive a second batch set of initial data from the second data source to which the contextual data sourcing module 118 sent a second batch initial request for data (e.g., the second social media website). The contextual data sourcing module 118 may receive a third batch set of initial data from the third data source to which the contextual data sourcing module 118 sent a third initial request for data (e.g., the third social media website). The contextual data sourcing module 118 may receive a fourth batch set of initial data from the fourth data source to which the contextual data sourcing module 118 sent a fourth initial request for data (e.g., the one or more internal databases). The contextual data sourcing module 118 may receive a fifth batch set of initial data from the fifth data source to which the contextual data sourcing module 118 sent a fifth initial request for data (e.g., the one or more mobile devices 162). The contextual data sourcing module 118 may tag each batch set of initial data with the data source that sent that set of initial data. Further, the contextual data sourcing module 118 may determine the data source that sent a batch initial set of data based on the contents of the batch set of initial data (e.g., the contents themselves may indicate the data source) or based on the address from which the batch set of initial data was received.

Processing may then proceed to modules 310 and 320. The contextual data sourcing module 118 may execute modules 310 and 320 in parallel or sequentially. At step 312, the contextual data sourcing module 118 may convert the initial data received at step 304 into a common format. As noted above, the initial requests for data transmitted by the contextual data sourcing module 118 may be directed to different data sources, and the initial sets of data received by the contextual data sourcing module 118 may be from different data sources. Therefore, the initial sets of data may each be formatted differently, depending on the data source from which initial set of data was transmitted.

In some examples, a different conversion system (described below in reference to FIG. 6) may be used for each data source. That is, an initial set of data from a first data source may be converted to the common format via a first conversion system, whereas an initial set of data from a second data source may be converted to the common format via a second conversion system. The contextual data sourcing module 118 may analyze the tag assigned to each initial set of data at step 304. Depending on the contents of the tag, the contextual data sourcing module 118 may then transmit that initial set of data to the appropriate conversion system.

For instance, based on the contents of the tag of the first initial set of data, the contextual data sourcing module 118 may transmit the first initial set of data to a first conversion system. When transmitting the first initial set of data to the first conversion system, the contextual data sourcing module 118 may set a flag indicating that the first initial set of data corresponds to a first user. Based on the contents of the tag of the second initial set of data, the contextual data sourcing module 118 may transmit the second initial set of data to a second conversion system. When transmitting the second initial set of data to the second conversion system, the contextual data sourcing module 118 may set a flag indicating that the second initial set of data corresponds to the first user. Based on the contents of the tag of the third initial set of data, the contextual data sourcing module 118 may transmit the third initial set of data to a third conversion system. When transmitting the third initial set of data to the third conversion system, the contextual data sourcing module 118 may set a flag indicating that the third initial set of data corresponds to the first user. Based on the contents of the tag of the fourth initial set of data, the contextual data sourcing module 118 may transmit the fourth initial set of data to a fourth conversion system. When transmitting the fourth initial set of data to the fourth conversion system, the contextual data sourcing module 118 may set a flag indicating that the fourth initial set of data corresponds to the first user. Based on the contents of the tag of the fifth initial set of data, the contextual data sourcing module 118 may transmit the fifth initial set of data to a fifth conversion system. When transmitting the fifth initial set of data to the fifth conversion system, the contextual data sourcing module 118 may set a flag indicating that the fifth initial set of data corresponds to the first user.

In another example, based on the contents of the tag for the first batch set of initial data, second batch set of initial data, third batch set of initial data, fourth batch set of initial data, and fifth batch set of initial data, the contextual data sourcing module 118 may send the first batch, second batch, third batch, fourth batch, and fifth batch to the first conversion system, second conversion system, third conversion system, fourth conversion system, and fifth conversion system, respectively. The transmittal of the first batch set of initial data to the first conversion system may include a flag indicating that the first batch set corresponds to a first set of users. The transmittal of the second batch set of initial data to the second conversion system may include a flag indicating that the second batch set corresponds to a second set of users. The transmittal of the third batch set of initial data to the third conversion system may include a flag indicating that the third batch set corresponds to a third set of users. The transmittal of the fourth batch set of initial data to the fourth conversion system may include a flag indicating that the fourth batch set corresponds to a fourth set of users. The transmittal of the fifth batch set of initial data to the fifth conversion system may include a flag indicating that the fifth batch set corresponds to a fifth set of users. The first, second, third, fourth, and fifth set of users may include the some or all of the same users or different users. Each conversion system may then convert the inputted initial set of data or the inputted batch set of initial data to the common format. At step 314, the converted data from each conversion system may be stored within the user contextual attributes database 136 (discussed below in reference to FIG. 6).

At step 322 of module 320, the contextual data sourcing module 118 may initiate a real-time or near real-time data feed from each data source. Once the contextual data sourcing module 118 has received an initial set of data for a particular user from a particular data source, sending repeated requests for data for that user to that data source may be inefficient and duplicative. That is, if a particular user has not updated their user profile at a particular data source and/or had any activity at that data source, there is no new data for that user at that data source. Accordingly, configuring the contextual data sourcing module 118 to send repeated requests for data for that user for that data source will result in no data being returned (or duplicative data being returned) from that data source. Accordingly, it may be advantageous to initiate a real-time or near real-time data feed for a user from a data source. In such examples, if the user updates their profile at the data source and/or if there is any activity within the user's account at the data source (for example, if the user changes a relationship status at the first social media website, posts a message on the second social media website, updates an employment status at the second social media website, and/or updates to the location at the user device 162), the data source will automatically send an update to the contextual data sourcing module 118.

For example, the contextual data sourcing module 118 may initiate a first real-time or near real-time data feed for the first user at the first data source (e.g., at the first social media website). The contextual data sourcing module 118 may configure the first real-time or near real-time data feed for the first data source via the first API provided by the first data source. In some examples, the contextual data sourcing module 118 may provide the first data source with a first callback URL. The contextual data sourcing module 118 may further provide the first data source with a list of objects and fields to monitor. When there is a change in any of the objects or fields designated by the contextual data sourcing module 118, the first data source will automatically send an update to the first callback URL. The update from the first data source may include an indication of the object type that the update relates to, the list of changes, an array of the fields that have changed to trigger the update, and a timestamp indicating when the update was sent. The contextual data sourcing module 118 may further initiate a second real-time or near real-time data feed for the first user at the second data source (e.g., at the second social media website). The contextual data sourcing module 118 may initiate the second real-time or near real-time data feed for the first user at the second data source via a streaming API provided by the second data source. The streaming API may be the same as or different than the second API provided by the second data source (discussed above in reference to step 302). The contextual data sourcing module 118 may initiate the second real-time or near real-time data feed via the streaming API using a "Get" HTTP command specifying the user and the types of updates requested. For example, the contextual data sourcing module 118 may select to receive information for just the first user. In another example, the contextual data sourcing module 118 may select to also receive messages from accounts the first customer follows. The contextual data sourcing module 118 may initiate a third real-time or near real-time data feed from the third data source for the first user. The contextual data sourcing module 118 may integrate with a library provided by the third data source. The library may provide APIs for different real-time data change streams, and the contextual data sourcing module 118 may select the API that corresponds to the data stream that the contextual data sourcing module 118 requires updates from. The contextual data sourcing module 118 may initiate a fourth real-time or near real-time data feed from the fourth data source for the first user. The contextual data sourcing module 118 may configure the fourth real-time or near real-time data feed via direct communication with the one or more databases on which the information from the digital interface is logged. Alternatively, the contextual data sourcing module 118 may configure the fourth real-time or near real-time data feed via communication with one or more servers or computing devices provided by the enterprise. The contextual data sourcing module 118 may initiate a fifth real-time or near real-time data feed from the fifth data source for the first user. The contextual data sourcing module 118 may configure the fifth real-time or near real-time data feed via the fourth API provided by the fifth data source. For instance, the contextual data sourcing module

118 may provide the fifth data source with a callback URL, and a list of objects and fields to monitor (e.g., latitude and longitude). When there is a change in any of the objects or fields designated by the contextual data sourcing module 118, the fifth data source will automatically send updated device position data to the callback URL. In some examples, the updated device position data may be coupled with a timestamp.

At step 324, the contextual data sourcing module 118 may receive one or more updates from any of the real-time or near real-time data feeds established at step 322. The contextual data sourcing module 118 may tag each of the received updates with the data source that the update was received from. In some examples, the contextual data sourcing module 118 may determine the data source that sent each update by examining the contents of the update itself, or by analyzing the address (e.g., IP address) that the update was sent from. The contextual data sourcing module 118 may then tag the update with a tag indicating the data source. The contextual data sourcing module 118 may then transmit the update to the corresponding conversion system for conversion, as discussed with reference to step 326.

Accordingly, the contextual data sourcing module 118 may receive a first update from the first data source (e.g., the first social media website), a second update from the second data source (e.g., the second social media website), a third update from the third data source (e.g., the third social media website), a fourth update from the fourth data source (e.g., the one or more databases), and/or a fifth update from the fifth data source (e.g., the one or more mobile devices). The contextual data sourcing module 118 may tag the first update with a first tag indicating the first data source, the second update with a second tag indicating the second data source, the third update with a third tag indicating the third data source, the fourth update with a fourth tag indicating the fourth data source, and the fifth update with a fifth tag indicating the fifth data source.

At step 326, the contextual data sourcing module 118 may convert the updates such that the data in the updates is in the common format. In examples where the updates from the various data sources are received in different formats, a different conversion system may be used to convert each update. Accordingly, based on the first tag, the contextual data sourcing module 118 may transmit the first update to a first conversion system (discussed below in reference to FIG. 6). The contextual data sourcing module 118 may include a flag in the transmittal indicating that the data in the transmittal is an update for the first user. Based on the second tag, the contextual data sourcing module 118 may transmit the second update to a second conversion system. The contextual data sourcing module 118 may include a flag in the transmittal indicating that the data in the transmittal is an update for the first user. Based on the third tag, the contextual data sourcing module 118 may transmit the third update to a third conversion system. The contextual data sourcing module 118 may include a flag in the transmittal indicating that the data in the transmittal is an update for the first user. Based on the fourth tag, the contextual data sourcing module 118 may transmit the fourth update to a fourth conversion system. The contextual data sourcing module 118 may include a flag in the transmittal indicating that the data in the transmittal is an update for the first user. The first conversion system, second conversion system, third conversion system, and fourth conversion system may then convert the first update, second update, third update, and fourth update, respectively, into a common format.

In some examples, at step 328, the converted updates may be saved in the user contextual attributes database 136. Processing may then return to step 324, where the contextual data sourcing module 118 may receive additional updates from one or more data sources.

Referring back to FIG. 2, in step 206, the contextual data sourcing module 118 may analyze the contextual data collected from the one or more internal sources such as the organization servers 164, the one or more external sources 150, and/or the one or more user devices 162. In some examples, the contextual data sourcing module 118 may analyze the contextual data according to the rules mapping data sources to certain contextual data. For instance, the contextual data sourcing module 118 may be configured with rules mapping one or more data sources (e.g., internal sources, external sources, user devices, and the like) to certain contextual data. As such, via the rules, the contextual data sourcing module 118 may recognize that certain data sources may be more or less suitable for certain types of information. For instance, the contextual data sourcing module 118 may prescribe that a user's credit score be retrieved from an internal bank server. In another example, the contextual data sourcing module 118 may prescribe that a user's marital/relationship status be based on information retrieved from a social media network or website, and/or that a user's employment status/history be based on information retrieved from LinkedIn. In yet another example, the contextual data sourcing module 118 may prescribe that a user's current location be based on information retrieved from a user device 162 (e.g., a GPS sensor of a smartphone or wearable device, an IP address of a desktop computer, and the like).

In examples where the contextual data sourcing module 118 maps more than one data source for a contextual data attribute, the contextual data sourcing module 118 may prescribe a hierarchy of reliability. For instance, the contextual data sourcing module 118 may set a primary preference that a user's location be based on information retrieved from a GPS sensor of a user device 162, a secondary preference that the user's location be based on cell tower triangulation of a user device 162, and a tertiary preference that the user's location be based on a location associated with the user's most recent social media network and/or social media website post. As such, where a GPS sensor is installed on a user device and available to provide location data, the contextual data sourcing module 118 may ignore the location data provided by the secondary and tertiary preferences for location data.

Alternatively, where data associated with a contextual data attribute is received from multiple data sources, the contextual data sourcing module 118 may compare the data across the different data sources to evaluate reliability and consistency (discussed in further detail below in reference to FIG. 7). In some examples, the contextual data sourcing module 118 may calculate a reliability score for data associated with a contextual data attribute. As such, the contextual data sourcing module 118 may only accept data that meets or exceeds a threshold reliability score (e.g., where the data is a trusted data element). For instance, where data relating to a user's relationship status is collected from a published relationship status on the user's social media network page, determined from a collection of photos in which a second social media network user is consistently tagged, and from internal bank servers, the contextual data sourcing module 118 may compare the relationship status across the different sources. Where the relationship status is the same or similar, the contextual data sourcing module 118 may designate the contextual data attribute for relationship status as a trusted data element. The contextual data sourcing module 118 may be configured such that only contextual data attributes designated as trusted data elements may be used in contextualizing the search results.

In some cases, the contextual data sourcing module 118 may be required to derive a contextual data attribute based on the data collected from the various data sources. For instance, the contextual data sourcing module 118 may be required to detect a recent or upcoming life event relating to a user based on data collected from internal sources, external sources 150, and/or user devices 162. In some examples, the contextual data sourcing module 118 may be configured with rules mapping life events to data collected by the contextual data sourcing module 118. For example, the rules may provide that an upcoming marriage is likely where the collected data includes: (1) information retrieved from an internal bank server relating to a large transaction at a jewelry store; and/or (2) a relationship status of "In a Relationship" retrieved from one or more social media data sources. In another example, the rules may provide that recent home purchase is likely where the collected data includes: (1) information retrieved from an internal bank server relating to an approved mortgage loan application; and/or (2) an event retrieved from a social media network and/or a social media website, where the event body includes the words "house warming."

In some examples, the contextual data sourcing module 118 may use predictive analytics techniques that learn from determination history maintained in the data store 130 (e.g., the user contextual attributes database 136). For instance, the contextual data sourcing module 118 may use predictive analytics techniques (e.g., supervised machine learning algorithms, unsupervised machine learning algorithms, and pattern recognition algorithms that are currently well-known in the art) to analyze contextual data associated with previous determinations associated with previous users to make predictions about likely recent or upcoming life events for the current user. As such, the contextual data sourcing module 118 may store the determination of life events along with the data collected from the various data sources. Further, in some examples, the contextual data sourcing module 118 may be configured to analyze the determination history in order to detect patterns in the data. As such, the contextual data sourcing module 118 may generate one or more rules to reflect the detected patterns in the determination history. Thus, the rules configured in the contextual data sourcing module 118 may manually defined or automatically defined using predictive analytics techniques.

In step 208, the user engagement tracking module 120 may collect user engagement data associated with the user device 162. User engagement data may be related to the user's behavior while interacting with the organization's services. User engagement data may thus be collected by monitoring a user's use of the organization's services via a user device 162 (e.g., a mobile application, a mobile browser, a desktop application, a desktop browser, a wearable device application, and so forth. User engagement data collected by the user engagement tracking module 120 may be stored in the user engagement metrics database 134.

Since the user device 162 may be in signal communication with an organization server 164 (via the organization network 160), the user engagement tracking module 120 may collect user engagement data at the user device 162 (e.g., at the client-side), at the organization server 164 (e.g., at the server-side), or a combination of both. On the client-side, the user engagement data may be tracked using, for example, cookies and/or web beacons. The cookies may be transient cookies (e.g., a cookie that is limited to the user's current online banking session, and will be erased once the session is closed or completed) or permanent cookies (e.g., a cookie that is stored on the user device 162 until its expiration date or until it is deleted). A web beacon may be an object (e.g., a transparent 1-pixel×1-pixel image, an iframe, and the like) embedded in the client-side instructions (e.g., HTML, and the like) rendered on the user interface presented on the user device 162. These example client-side tracking mechanisms may provide information including, but not limited to, the time of access by the user device 162, the IP address of the user device 162, and configuration information related to the user device 162. In other examples, user engagement tracking module 120 may track user engagement data on the client-side in accordance with method of sourcing data described above with reference to the fourth data source.

On the server-side, the user engagement tracking module 120 may track user engagement data using, for example, application logs stored on an organization server 164. For instance, the user engagement tracking module 120 may scrap the application log files determine the IP address of the accessing device, the hostname, the language, the date and time the page was loaded on the client-side, the page(s) loaded on the client-side, the referring page(s), the help topic(s) viewed, Further, in step 208, the user engagement tracking module 120 may analyze the information collected from the client-side and/or server-side tracking mechanisms. For instance, the user engagement tracking module 120 may derive additional user engagement metrics. The additional user engagement metrics may describe the user's behavior across multiple sessions. As such, the user engagement tracking module 120 may aggregate (e.g., sum, average, and the like) data relating to individual sessions. For example, the user engagement tracking module 120 may calculate the total number of times a user has accessed a page, the number of times the user has accessed the page from different devices (e.g., the user performed a search for help topics on a mobile device, and later performed the same search on a desktop computer), average time spent on a help topic, average time spent on a page, format of preferred help topics (e.g., text, graphic, video, audio, and the like), and so forth.

In step 210, the search results contextualization module 122 may calculate a rank for each of the help topics in the uncontextualized set of search results. In some examples, the search results contextualization module 122 may rank a help topic based on a combination of the relevance score, as calculated by the search query formation module 116, and a context score calculated by the search results contextualization module 122. Further, in some examples, the search results contextualization module 122 may rank a help topic based on a combination of a weighted relevance score and a weighted context score. As such, the search results contextualization module 122 configured to assign more weight to the relevance score or the context score. In some examples, the rank may be an absolute position of the help topic in the contextualized set of search results. In this example, the help topic to be displayed first would have a rank of one, the help topic to be displayed second would have a rank of two, the help topic to be displayed third would have a rank of three, and so forth. In another example, the rank may represent a relative score associated with the help topics in the uncontextualized set of search results. As such, the search results contextualization module 122 may sort the help topics in the uncontextualized set of search results such that the help topic with the highest rank is in the first position, the help topic with the second-highest is in the second position, the help topic with the third-highest is in the third position, and so forth.

The context score for a help topic may be calculated based on the contextual data collected and analyzed by the contextual data sourcing module 118 for the user (stored in the user contextual attributes database 136) and the user engagement data collected and analyzed by the user engagement tracking module 120 (stored in the user engagement metrics database 134) for the user. For example, the context score for a help topic will be higher if it corresponds one or more of the recent or upcoming life events identified by the contextual data sourcing module 118. More specifically, where the contextual data sourcing module 118 identified that a user is getting married in a few months, the context score for a help topic relating to joint accounts and/or merging assets will likely be higher than a help topic relating to individual savings accounts. In another example, the context score for a help topic in a video format will be lower where the user engagement metrics indicate that the user is currently accessing the organization's services via a cellular network, as determined by the user engagement tracking module 120. In yet another example, the context score for a help topic will be higher if it is specific to the state in which the user resides, as determined by the device location data collected and analyzed by the contextual data sourcing module 118.

Additionally, the context score may be based on data collected by the user interaction contextualization system 110 for other similar users. As such, the user interaction contextualization system 110 may collect and store user engagement metrics (e.g., historical user engagement metrics) related to a user's engagement with the help topics displayed in response to the user's search request, such that the engagement metrics may be used by the search results contextualization module 122 to calculate ranks for help topics for subsequent users. The historical user engagement metrics may be stored in the data store 130. For instance, the search results contextualization module 122 may use predictive analytics techniques to learn from the historical user engagement metrics maintained in the data store 130. In particular, the search results contextualization module 122 may analyze the historical user engagement data associated with previously rendered help topics for previous users to make predictions about which help topics were more successful at engaging users with similar recent or upcoming life events and/or user engagement metrics as the current user. Further, the search results contextualization module 122 may be configured to analyze the historical use engagement metrics to detect patterns in the data. As such, the search results contextualization module 122 may generate one or more rules to reflect the detected patterns in the historical user engagement metrics.

In step 212, the search results contextualization module 122 may generate a contextualized set of search results by applying the ranks calculated for each of the help topics in the uncontextualized set of search results in step 210. For instance, the search results contextualization module 122 may order the help topics in the uncontextualized set of search results by rank. As described above, the rank calculated for a help topic may either be an absolute position or a relative score. Additionally or alternatively, the search results contextualization module 122 may eliminate help topics with relevance scores, context scores, and/or ranks lower than a threshold amount. As such, the contextualized set of search results derived by applying the calculated ranks may include some of all of the help topics included in the uncontextualized set of search results.

The search results rendering module 124, in step 214, may then prepare the client-side instructions to display the contextualized set of search results. The prepared client-side instructions may be communicated to the user device 162 via the communication interface 140 of the user interaction contextualization system 110. In response, the user device 162 may be configured to display the prepared client-side instructions via an application and/or browser.

In some examples, in preparing the client-side instructions, the search results rendering module 124 may adjust the presentation of the contextualized set of search results based on the contextual data and user engagement data associated with the user. For instance, where the user engagement data indicates that the user is on a mobile device, and where full-text of a help topic is longer than a threshold amount, the search results rendering module 124 may collapse, truncate, and/or suppress particular sections of the help topic, to optimize the presentation of the help topics for small-screen displays. The collapsed, truncated, and/or suppressed content of the help topic may be display upon request by the user device 162. These modifications by the search results contextualization module 122 and the search results rendering module 124 represent a technological improvement to the display of the user device 162 with a small-screen display by displaying information that is more likely to be pertinent to the user associated with the user device 162.

In some cases, where the user engagement data indicates that the user accesses the organization's services via multiple devices (e.g., a desktop computer and a mobile device, a laptop and a mobile device, a laptop and a wearable device, and so forth), the search results rendering module 124 may generate multiple sets of client-side instructions including the contextualized set of search results. In these examples, the client-side instructions may be modified to take advantage of the screen size and screen resolution provided by a user device 162. For instance, where the user is currently in an active session via a mobile device, the search results rendering module 124 may prepare the client-side instructions such that one or more sections of one or more help topics are collapsed, truncated, or suppressed, as described above. Additionally or alternatively, where the user engagement data indicates that the user has previously accessed the organization's services via a desktop computer, the search results rendering module 124 may prepare the client-side instructions to take advantage of a faster network connection (e.g., by including interactive help topics, by including video content, and the like) and/or of a larger display size (e.g., including more help topics, expanding all sections of the help topics, and the like). In some examples, where the user engagement data indicates that the mobile device and the desktop computer are in close proximity to each other (e.g., within a threshold radius), and where the help topics selected for the user would be more suitably viewed via a faster network connection and/or on a larger display, the search results rendering module 124 may issue a notification to the user device 162 of the same. As such, the user associated with the user device 162 may be provided an option to access the contextualized set of search results via an alternative device, even where the user is not currently engaged in an active session via the alternative device. The search results rendering module 124 may then deliver the client-side instructions to display the contextualized results to the alternative device instead of to the user device 162.

To continually improve the quality of help topics included in the contextualized set of search results, in step 216, the user interaction contextualization system 110 may collect and analyze user engagement data with the contextualized set of results presented to the user device 162. The user engagement data may be stored in the user engagement metrics database 134 as historical user engagement data, and may be used by the user interaction contextualization system 110 (e.g., by the search results contextualization module 122) to provide more contextually relevant help topics to subsequent users demonstrating similar life events and user engagement data.

Figure 6:
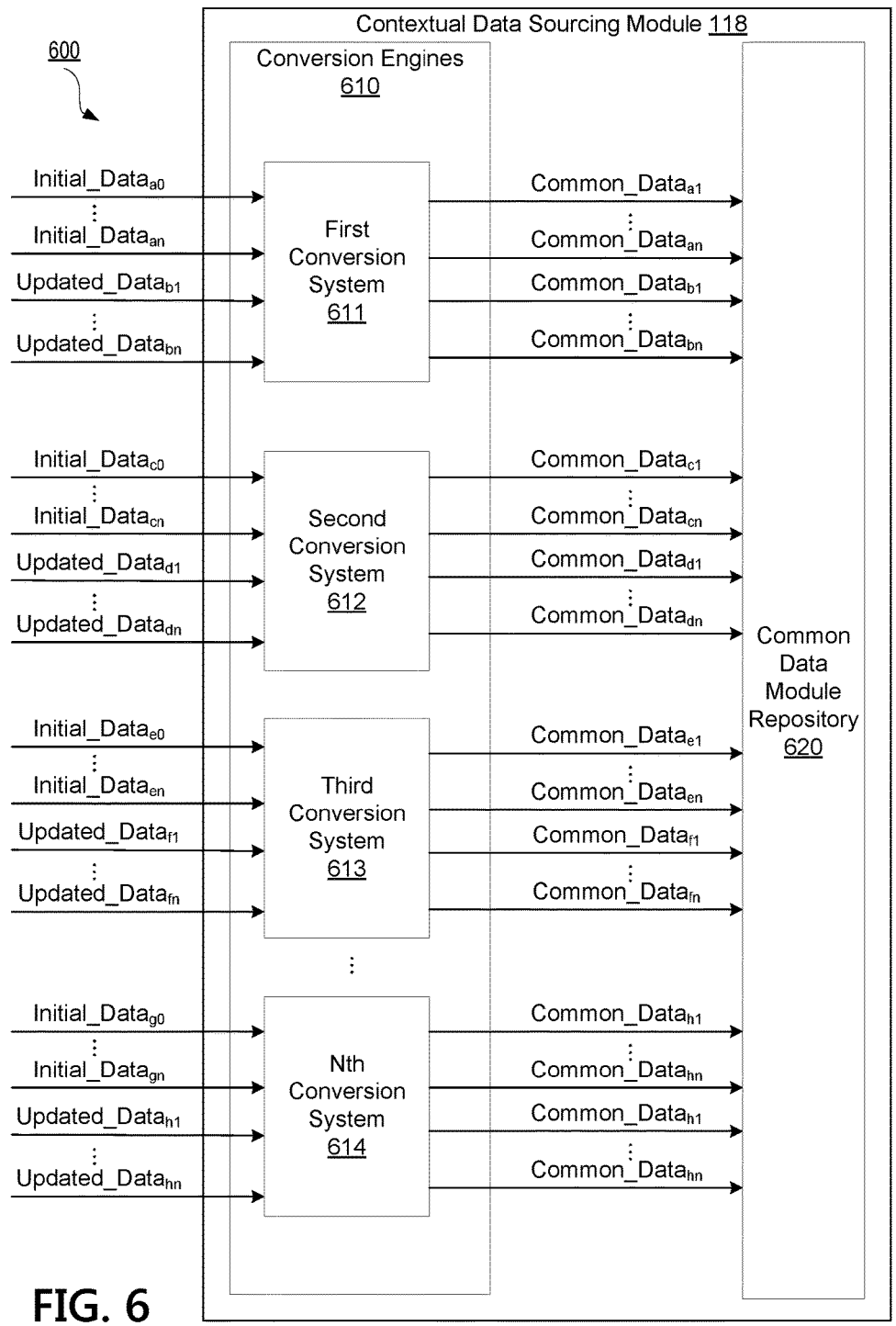
FIG. 6 is a block diagram of an illustrative contextual data sourcing module that may be utilized to convert sourced contextual data to a common format in accordance with one or more aspects described herein.

Referring now to FIG. 6, a block diagram 600 of an illustrative contextual data sourcing module 118 is shown. The contextual data sourcing module 118 may include one or processors or servers (not shown) that transmit requests for initial data and requests for updated data, and that receive the sets of initial data and the sets of updated data from one or more data sources. The contextual data sourcing module 118 may further include one or more conversion systems. For example, as shown in FIG. 6, the contextual data sourcing module 118 may include first conversion system 611, second conversion system 612, third conversion system 613, and fourth conversion system 614. The depiction of four conversion systems is for illustrative purposes, and a greater number or fewer number of conversion systems may be used. For example, the contextual data sourcing module 118 may include one or more conversion system for each data source from which the contextual data sourcing module 118 receives user data.

Each of the first conversion system 611, second conversion system 612, third conversion system 613, and fourth conversion system 614 may receive one or more sets of initial data (shown as $Initial\_Data_{a0}$ ... $Initial\_Data_{an}$, $Initial\_Data_{b0}$ ... $Initial\_Data_{bn}$, $Initial\_Data_{c0}$ ... $Initial\_Data_{cn}$, and $Initial\_Data_{a0}$ ... $Initial\_Data_{an}$). Each set of initial data may be associated with a single user of the enterprise or may be associated with a batch of users of the enterprise. Each set of initial data may include a tag identifying the single user or the batch of users with whom that set of initial data is associated. The format of the set of initial data received by each conversion system may differ, as the data source for the sets of initial data may differ. For example, as discussed above in reference to FIG. 3, a first set of initial data received from a first data source may be sent to a first conversion system 611, a second set of initial data received from a second data source may be sent to a second conversion system 612, a third set of initial data received from a third data source may be sent to third conversion system 613, and a fourth set of initial data received from a fourth data source may be sent to fourth conversion system 614. First data source, second data source, third data source, and fourth data source may each be different data sources, and the data received from each of these data sources may be in a different data format. The conversion systems may convert the sets of initial data received from each of these data sources into a common, predetermined format.

The contextual data sourcing module 118 may further include a common data module repository 620. The common data module repository 620 may store a plurality of common data modules (not shown). A common data module may be stored for each user of the enterprise. Each common data module may include a plurality of common data fields. The common data fields may be predetermined data fields. For example, the common data fields may include name, age, gender, account number(s) (e.g., a list of account numbers associated with one or more financial accounts maintained by the enterprise for the user), services (e.g., a list of services provided by the enterprise for the user), marital status, family members (e.g., a list of family members of the user), employment status, current employer, education information (e.g., a list of colleges/universities that the user has graduated from, the date of graduation, and the like), residency location, contact information (phone number, email address, and the like), a set of user devices associated with the user and/or any other desired information. These common data fields may be populated with a value by one or more of first conversion system 611, second conversion system 612, third conversion system 613, and fourth conversion system 614 (discussed below). If multiple conversion systems have different values for a same common data field (for example, the first conversion system 611 has a first age for a first user and the second conversion system 612 has a second age for the first user), both values may be stored within the common data field. In addition to populating the common data fields with values, the conversion systems may populate the common data field with a timestamp indicating the time the value was received and a data source flag indicating the data source from which the value was received.

Accordingly, the common data module repository 620 may serve as a repository of all data for all users from all data sources. The data may be stored in a common format. The conversion systems may overwrite old data with new data as updates are received from data sources (discussed below). The conversion systems may further supplement old data with new data as updates are received from various data sources (discussed below).

The first conversion system 611 may convert one or more sets of initial data received from the first data source (shown as $Initial\_Data_{a0}$ ... $Initial\_Data_{an}$) to produce one or more sets of data that are in compliance with a predetermined format (shown as $Common\_Data_{a0}$ ... $Common\_Data_{an}$). As discussed above with reference to FIG. 3, each set of initial data sent to the first conversion system 611 may include information identifying the user or set of users associated with that set of initial data. The first conversion system 611 may extract the identifying information from the inputted set of initial data. If the inputted data is associated with a batch of users (e.g., the input includes multiple sets of initial data each associated with a different user), the first conversion system 611 may convert each set of initial data in parallel or sequentially.

The first conversion system 611 may convert a first set of initial data $Initial\_Data_{a0}$ associated with a first user by extracting one or more field names and corresponding field values from the first set of initial data. As discussed above in reference to FIG. 3, data from the first data source may be accessible via a first API that includes various nodes, edges, and fields. The contextual data sourcing module 118 may send an HTTP "Get" request to the first API that specifies the fields and/or edges that the contextual data sourcing module 118 requests to read. The first set of initial data received from the first data source may include one or more field names and a field value that is associated with each of the one or more field names. The first conversion system 611 may extract each of the one or more field names and the field values associated with each of the one or more field names from the first set of initial data $Initial\_Data_{a0}$. The first conversion system may extract the data via cursor-based pagination or time-based pagination. The first conversion system 611 may then map the extracted field names and extracted field values to the common data fields to generate a set of common data $Common\_Data_{a0}$. The first conversion system 611 may then populate the common data fields in the common data module associated with the first user with the corresponding field values by transmitting the set of common data Common_Data$_{a0}$ to the common data module repository 620. The first conversion system 611 may repeat the conversion process for each set of initial data received from the contextual data sourcing module 118. That is, for an $n^{th}$ set of initial data Initial_Data$_{an}$ received by the first conversion system 611 from the contextual data sourcing module 118 for an $n^{th}$ user, the first conversion system 611 may generate an $n^{th}$ set of common data Common_Data$_{an}$ and populate the common data fields of the $n^{th}$ common data module maintained by the enterprise for the $n^{th}$ user within the common data module repository 620.

As discussed above in reference to FIG. 3, the first conversion system 611 may additionally receive a set of updated data for a user. For example the first conversion system 611 may receive a first set of updated data Updated_Data$_{b1}$ for a first user, wherein the first set of updated data is associated with a first data source. The first set of updated data may include one or more field names, as well as a field value for each field name. The first conversion system 611 may extract each field name and corresponding field value from the first set of updated data. The first conversion system 611 may then map each field name to a corresponding common data field. The first conversion system 611 may then generate a first set of common data Common_Data$_{b1}$ that includes the extracted field values that correspond to the common data fields. The first conversion system 611 may then transmit the first set of common data Common_Data$_{b1}$ to the common data module repository 620, and populate the first common module associated with first user with the corresponding extracted field values.

The first conversion system 611 may populate the first common module differently based on the current contents of the first common module. For example, the first set of updated data Updated_Data$_{b1}$ for the first user received by the first conversion system 611 from the contextual data sourcing module 118 (and the first data source) may include a field name and field value indicating that the current age of the first user is 30. The first conversion system 611 may analyze the corresponding common data field and value in the first common data module. If the corresponding common data field is non-populated (e.g., does not contain a value), the first conversion system 611 may populate the value of the corresponding common data field with the value in the set of common data Common_Data$_{b1}$. The first conversion system 611 may further include a timestamp and a flag indicating that the value is associated with the first data source. If the corresponding common data field is populated with a current value, the first conversion system 611 may determine the data source associated with the current value. If the data source associated with the current value is the first data source, the first conversion system 611 may overwrite the current value of the corresponding common data field with the field value in the common data set Common_Data$_{b1}$ (e.g., 30). The first conversion system 611 may further include a timestamp and a flag indicating that the value is associated with the first data source. If the data source associated with the current value is not the first data source, the first conversion system 611 may not modify the current value and further populate the corresponding common data field with the field value in the common data set Common_Data$_{b1}$ (e.g., 30). The first conversion system 611 may further include a timestamp and a flag indicating that the value is associated with the first data source. If the first set of updated data included multiple field names and field values, the first conversion system 611 may update the first common module as described above for each field name and field value. The first conversion system 611 may repeat the updating process for each set of updated data received from the contextual data sourcing module 118. That is, for an $n^{th}$ set of updated data Updated_Data$_{bn}$ received by the first conversion system 611 from the contextual data sourcing module 118 for an $n^{th}$ user, the first conversion system 611 may generate an $n^{th}$ set of common data Common_Data$_{bn}$ and populate the common data fields of the $n^{th}$ common data module maintained by the enterprise for the $n^{th}$ user within the common data module repository 620.

The second conversion system 612, third conversion system 613, and fourth conversion system 614 may similarly receive and convert sets of initial data. The extraction and mapping utilized by each conversion system may differ as a result of the different formats of the received sets of initial data and updated data. The second conversion system 612 may receive one or more sets of initial data Initial_Data$_{c1}$ . . . Initial_Data$_{cn}$. The second conversion system 612 may extract field names and field values within each of these sets of initial to produce one or more sets of common data Common_Data$_{c1}$ . . . Common_Data$_{cn}$. The second conversion system 612 may then populate the common data modules associated with the users for which the sets of initial data are received (and stored in common data module repository 620) with the values in the sets of common data Common_Data$_{c1}$ . . . Common_Data$_{cn}$ using the population method for sets of initial data described above in reference to the first conversion system 611. The second conversion system 612 may include a time stamp for each populated value and an indication that the populated value is associated with the second data source. The second conversion system 612 may further receive one or more sets of updated data Updated_Data$_{d1}$ . . . Updated_Data$_{dn}$. Second conversion system 612 may extract field names and field values within each of these sets of updated data to produce one or more sets of common data Common_Data$_{d1}$ . . . Common_Data$_{dn}$. The second conversion system 612 may then populate the common data modules associated with the users for which the sets of updated data are received (and stored in the common data module repository 620) with the values in the sets of common data Common_Data$_{d1}$ . . . Common_Data$_{dn}$ using the population method for sets of updated data described above in reference to the first conversion system 611. The second conversion system 612 may include a time stamp for each populated value and an indication that the populated value is associated with the second data source.

The third conversion system 613 may receive one or more sets of initial data Initial_Data$_{e1}$ . . . Initial_Data$_{en}$. The third conversion system 613 may extract field names and field values within each of these data sets to produce one or more sets of common data Common_Data$_{e1}$ . . . Common_Data$_{en}$. The third conversion system 613 may then populate the common data modules associated with the users for which the sets of initial data are received (and stored in the common data module repository 620) with the values in the sets of common data Common_Data$_{e1}$ . . . Common_Data$_{en}$ using the population method for sets of initial data described above in reference to the first conversion system 611. The third conversion system 613 may include a time stamp for each populated value and an indication that the populated value is associated with the third data source. The third conversion system 613 may further receive one or more sets of updated data Updated_Data$_{f1}$ . . . Updated_Data$_{fn}$. The third conversion system 613 may extract field names and field values within each of these sets of updated data to produce one or more sets of common data Common_

Data$_{f1}$ ... Common_Data$_{fn}$. The third conversion system 613 may then populate the common data modules associated with the users for which the sets of updated data are received (and stored in the common data module repository 620) with the values in the sets of common data Common_Data$_{f1}$ ... Common_Data$_{fn}$ using the population method for sets of updated data described above in reference to the first conversion system 611. The third conversion system 613 may include a time stamp for each populated value and an indication that the populated value is associated with the third data source.

The fourth conversion system 614 may receive one or more sets of initial data Initial_Data$_{g1}$ ... Initial_Data$_{gn}$. The fourth conversion system 614 may extract field names and field values within each of these data sets to produce one or more sets of common data Common_Data$_{g1}$ ... Common_Data$_{gn}$. The fourth conversion system 614 may then populate the common data modules associated with the users for which the sets of initial data are received (and stored in the common data module repository 620) with the values in the sets of common data Common_Data$_{g1}$ ... Common_Data$_{gn}$ using the population method for sets of initial data described above in reference to the first conversion system 611. The fourth conversion system 614 may include a time stamp for each populated value and an indication that the populated value is associated with the fourth data source. The fourth conversion system 614 may further receive one or more sets of updated data Updated_Data$_{h1}$ ... Updated_Data$_{hn}$. The fourth conversion system 614 may extract field names and field values within each of these sets of updated data to produce one or more sets of common data Common_Data$_{h1}$ ... Common_Data$_{hn}$. The fourth conversion system 614 may then populate the common data modules associated with the users for which the sets of updated data are received (and stored in common data module repository 620) with the values in the sets of common data Common_Data$_{h1}$ ... Common_Data$_{hn}$ using the population method for sets of updated data described above in reference to the first conversion system 611. The fourth conversion system 614 may include a time stamp for each populated value and an indication that the populated value is associated with the fourth data source.

Figure 7:
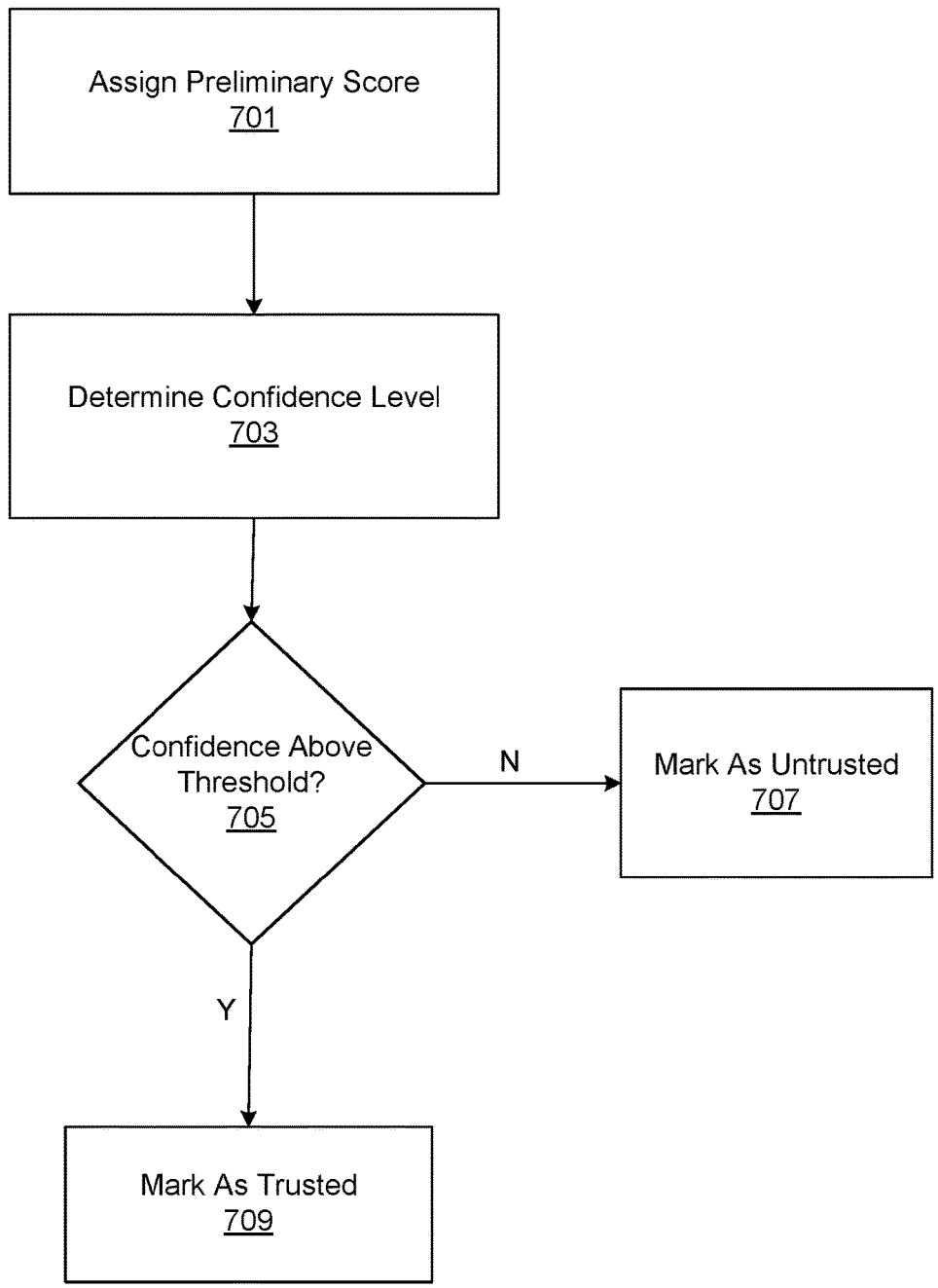
FIG. 7 is a flowchart of an illustrative method for analyzing one or more common data fields in accordance with one or more aspects described herein.

FIG. 7 depicts an illustrative method for analyzing one or more common data fields. The method may be executed by the contextual data sourcing module 118. The contextual data sourcing module 118 may analyze one or more common data fields from one or more common modules in the common data module repository 620 utilizing the illustrated method.

The contextual data sourcing module 118 may assign a preliminary score to the first common data field based on a first set of rules stored in the contextual data sourcing module 118. The first set of rules may include one or more probabilistic models that may be dynamically modified within the contextual data sourcing module 118. The first set of rules may include relationships between common data fields and the data source(s) that provided the value(s) of the common data fields. That is, as discussed above in reference to FIG. 6, a common data field may include multiple values, wherein each value may be received from a different data source (such as the first data source, second data source, third data source, and fourth data source discussed above in reference to FIG. 3). The first set of rules may indicate the preliminary scores to be assigned to these values based on the data sources that provided these values.

For example, each common data module stored in the common data module repository 620 may include at least a first common data field and a second common data field. In this example, the first common data field may be the marital status of the first user, and the second common data field may represent the employment status of the second user. The first common data field of the first common data module may store a first value that was received by the contextual data sourcing module 118 from the first data source. The first common data field of the first common data module may further store a second value that was received by the contextual data sourcing module 118 from the third data source. The second common data field of the first common data module may store a third value that was received by the contextual data sourcing module 118 from the first data source. The second common data field of the first common data module may further store a fourth value that was received by the sourcing engine 118 from the third data source. The first set of rules may indicate that a value for the first common data field that is associated with the first data source is to be assigned a first score and that a value for the first common data field that is associated with the third data source is to be assigned a second score. The second score may be lower than the first score. That is, the enterprise may have determined that values for the first common data field are more reliable when sourced from the first data source than when sourced from the third data source, and the first set of rules may indicate this. The first set of rules may further indicate that a value for the second common data field that is associated with the first data source is to be assigned a third score and that a value for the second common data field that is associated with the third data source is to be assigned a fourth score. The fourth score may be higher than the third score. That is, the enterprise may have further determined that values for the second common data field are more reliable when sourced from the third data source than when sourced from the first data source, and the first set of rules may indicate this.

At step 703, the contextual data sourcing module 118 may determine a confidence level for the first common data field based on a second set of rules stored in the contextual data sourcing module 118. The contextual data sourcing module 118 may determine the confidence level by applying the second set of rules to the preliminary score calculated in step 701. The second set of rules may include one or more probabilistic models. For example, a first rule in the second set of rules may indicate that if the timestamp associated with a first value of the first common data field indicates that the first value was sourced prior to a predetermined date or prior to a predetermined amount of time, the preliminary score is to be decreased. The first rule in the second set of rules may further indicate that if the timestamp associated with the first value was not sourced prior to a predetermined date or prior to a predetermined amount of time, the preliminary score is to be increased. A second rule in the second set of rules may analyze the number of values that are currently populated for the common data field. That is, as noted above, a common data field may include multiple values, wherein each value may be received from a different data source. The second rule may adjust the preliminary score based on the number of values that are currently stored in the common data field. The second rule may include multiple thresholds levels. In one instance, the second rule may specify that if the common data field only includes a single value, the preliminary score is to be increased by a first amount. The second rule may further specify that if the number of values stored for a common data field is between a first threshold and a second threshold, the preliminary score is to be decreased by a second amount. If the number of values stored for a common data field is between a third threshold and fourth threshold, the second rule may indicate that the preliminary score is to be decreased by a third amount, and so forth.

For example, each common data module stored in the common data module repository 620 may include at least a first common data field and a second common data field. The first common data field of the first common data module may store a first value that was received by the contextual data sourcing module 118 from the first data source. The first common data field may further store a second value that was received by the contextual data sourcing module 118 from the second data source. The second common data field may store only a third value that was received by the contextual data sourcing module 118 from the first data source. In this example, the contextual data sourcing module 118 may increase the preliminary score calculated for the first common data field at step 701, as the first common data field only stores a single value. The contextual data sourcing module 118 may further decrease the preliminary score calculated for the second common data field at step 701, as the second common data field stores multiple values.

The first rule of the second set of rules and the second rule of the second set of rules are for illustrative purposes, and a greater number of rules or fewer number of rules may be included in the second set of rules. The contextual data sourcing module 118 may adjust the preliminary score calculated in step 701 using a plurality of rules from the second set of rules. For example, the contextual data sourcing module 118 may increase the preliminary score calculated in step 701 after applying a first rule, and may then decrease the adjusted preliminary score after applying a second rule. Once the contextual data sourcing module 118 has applied all applicable rules from the second set of rules, the final calculated score may represent the confidence level of the first common data field.

At step 705, the contextual data sourcing module 118 may determine if the confidence level calculated in step 703 is above a threshold. The threshold used in step 705 may be predetermined and may be dynamically modified within the contextual data sourcing module 118. If, at step 705, the contextual data sourcing module 118 determines that the confidence level is not above the threshold, the contextual data sourcing module 118 may, at step 707, set a flag within the first common data module indicating that the first common data field is not a trusted data field. If, at step 705, the contextual data sourcing module 118 determines that the confidence level is above the threshold, the contextual data sourcing module 118 may, at step 709, set a flag within the first common data module indicating that the first common data field is a trusted data field. Trusted data fields may then be utilized by one or more components within the entity computing system 110 to drive further user-based decision making.

Figure 4:
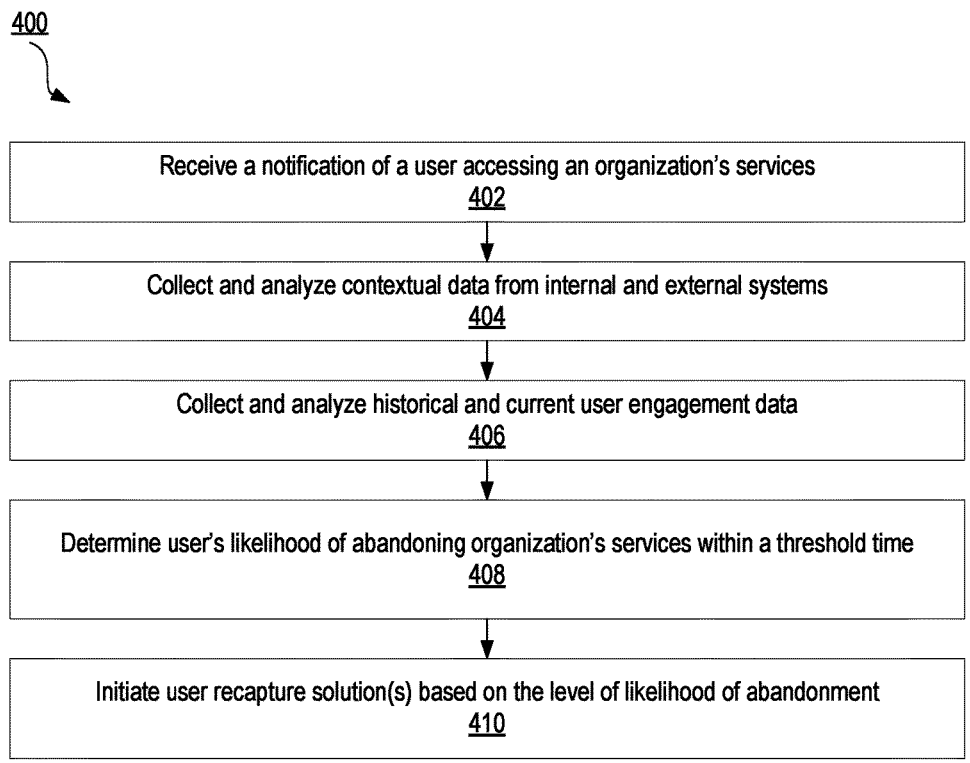
FIG. 4 is a flowchart of an illustrative method for recapturing an Internet user in a networked computing system in accordance with one or more aspects described herein.

Referring now to FIG. 4, a flowchart 400 of example steps for initiating user recapture solutions is shown. The various components of the user interaction contextualization system 110 may be used to perform these method steps. In this example, in step 402, the user interaction contextualization system 110 may receive a notification of a user accessing an organization's services via a user device 162. For instance, the user may access an organization's online banking services via a mobile browser and/or a mobile application installed on a smartphone. In another example, the user may access an organization's online banking services via a browser installed on a laptop. In yet another example, the user may access an organization's banking services (e.g., withdrawals, transfers, deposits, payments balance inquiries, and so forth) via an ATM.

Upon receiving the notification, in step 404, the contextual data sourcing module 118 may collect contextual data from one or more internal sources (e.g., organization servers 164, and the like), one or more external sources 150 (e.g., search systems, social media channels, and the like), and/or one or more user devices 162. The contextual data sourcing module 118 may retrieve and analyze data from the various sources as described above with reference to FIG. 2 and FIG. 3.

In step 406, the user engagement tracking module 120 may collect user engagement data associated with the user device 162. User engagement data may be related to the user's behavior while interacting with the organization's services. As described above with reference to FIG. 2, user engagement data may be collected by monitoring a user's use of the organization's services via a user device 162 (e.g., a mobile application, a mobile browser, a desktop application, a desktop browser, a wearable device application, and so forth). Further, as described above with reference to FIG. 2, user engagement data may be collected at the client-side (e.g., at the user device 162) and/or on the server-side (e.g., an organization server 164).

Further, user engagement data may be collected from an ATM, where an ATM may be the user device 162. Since the ATM may be in signal communication with an organization server 164 (via the organization network 160), the user engagement tracking module 120 may collected user engagement data at the ATM (e.g., at the client-side), at the organization server 164 (e.g., at the server-side), or a combination of both. On the client-side, the user engagement data may be tracked using cookies and/or web beacons, as described above. Additionally or alternatively, various sensors may be installed at, attached to, or in signal communication with the ATM to track client-side user engagement. The sensors may be capable of detecting and recording various conditions at the ATM relating to the user's interaction with the ATM. For instance, the sensors may include a camera, a motion sensor (e.g., to monitor movement of the user at the ATM, such eye tracking), a presence sensor (e.g., to monitor presence of the user at the ATM), a pressure sensor (e.g., to monitor the use of the ATM's input devices, such as the keypad), and so forth. As such, the sensors may be capable of collecting data indicating disengagement by the user, such as the body movement away from the ATM, eye movement away from the ATM, use of another device during session via ATM, and so forth.

Accordingly, in step 408, the user recapture module 126 may determine a user's likelihood of abandoning the organization's services via the user device 162 within a threshold time. The likelihood of abandonment may be determined based on the contextual data collected and analyzed by the contextual data sourcing module 118 for the user (stored in the user contextual attributes database 136) and the user engagement data collected and analyzed by the user engagement tracking module 120 (stored in the user engagement metrics database 134) for the user. In some examples, the likelihood of abandonment may denoted by a level of risk (e.g., Low Risk of Abandonment, Medium Risk of Abandonment, High Risk of Abandonment, and so forth), where the level of risk is higher if there a higher probability that the user will end the session. For instance, where the user is accessing the organization's services via mobile browser of a smartphone, the likelihood of abandonment is likely high where the user engagement data indicates that a user scrolled down to the last help topic in a set of search results within a threshold time (e.g., 5 seconds, 1 minute, and so forth). In another example, where the user is accessing the organization's services via an ATM, the likelihood of abandonment is likely low where the user engagement data indicates that the user is consistently interacting with the ATM (e.g., data from the pressure sensors installed a keypad of an ATM may indicate constant input from the user).

Additionally, the likelihood of abandonment may be based on data collected by the user interaction contextualization system 110 for other similar users. As such, the user interaction contextualization system 110 may collect and store user engagement metrics (e.g., historical user engagement metrics) related to a user's engagement with the organization's services, such that the engagement metrics may be used by the user recapture module 126 to determine a likelihood of abandonment. The historical user engagement metrics may be stored in the data store 130 (e.g., the user engagement metrics database 134). For instance, the user recapture module 126 may use predictive analytics techniques to learn from the historical user engagement metrics maintained in the data store 130. In particular, the user recapture module 126 may analyze the historical user engagement data associated with previous users' interactions with the organization's services to make predictions about when a user is more likely to abandon the organization's services. Further, the user recapture module 126 may be configured to analyze the historical user engagement metrics to detect patters in the data. As such, the user recapture module 126 may generate one or more rules to reflect detected patterns in the historical user engagement metrics. For instance, the user recapture module 126 may identify and store rules relating to certain user behaviors that indicate that the user is likely to abandon the organization's services within a threshold time.

In step 410, the user recapture module 126 may choose to initiate one or more user recapture solutions. In some examples, the user recapture module 126 may select a user recapture solution based on the level of likelihood of abandonment. For instance, where the user is accessing the organization's services via a browser (e.g., a desktop browser or a mobile browser), the user recapture module 126 may instruct, via client-side instructions, the user device 162 to adjust the rendered webpage to include suggestions for alternative pages. In some examples, the user recapture module 126 may generate suggestions by analyzing the historical user engagement data to determine other pages visited by similar users who also visited the page that is currently displayed on the user device 162. Additionally or alternatively, the user recapture module 126 may instruct the user device 162 to prevent further user interaction with the current page (e.g., by hiding or blocking some or all of the UI elements displayed) and to display an overlay (e.g., pop-up, dialog box, and the like) including a suggestions for alternative pages.

In other examples, the user recapture module 126 may instruct the user device 162 to display an input element to enable searching for help topics. In response to the search request, the user recapture module 126 may display a contextualized set of search results on the current page (e.g., in a sidebar, on a pop-up, and the like) or render a full-page dedicated to the contextualized set of search results.

Figure 5:
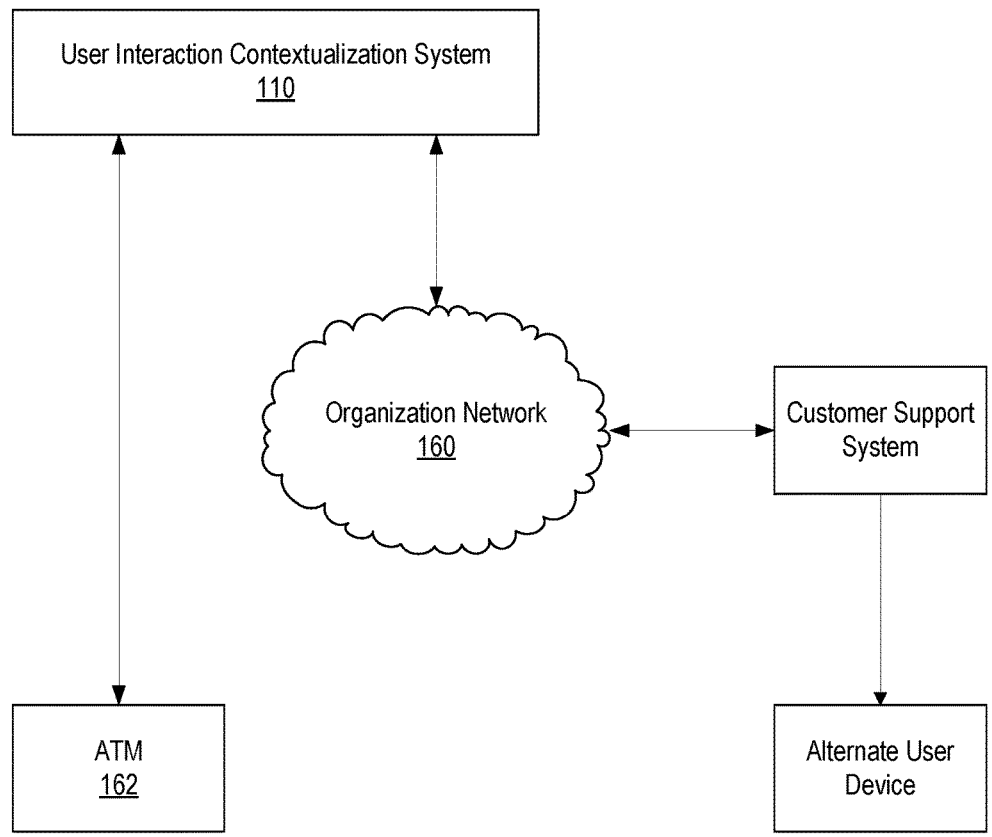
FIG. 5 is a block diagram of an illustrative computing environment for recapturing users accessing the organization's services via an ATM.

In examples where the user device 162 is an ATM, the user recapture module 126 may initiate communication with the user via the ATM or an alternative device associated with the user's account (e.g., a smartphone, a wearable device, and the like). As such, the user recapture module 126 may activate the alternative device by sending a push notification, since the alternative device may not be engaged in an online banking session. The user recapture module 126 may determine that the alternative device is within a threshold radius from the ATM. In some examples, the communication may be a push notification to a mobile device of the user with information relating to the nearest bank branch based on the current location of the user device 162 (e.g., as determined by the contextual data sourcing module 118 based on a GPS sensor installed on the user device 162). In another example, the communication may be a push notification to a mobile device with one or more help topics. The help topics included in the push notification may be based on the contextual data and user engagement data associated with the user. In other examples, the user recapture module 126 may send a notification relating to the user's likelihood of abandonment to a customer support system, where the customer support system is in signal communication with the user recapture module 126 via the organization network 160. The notification may include a request to provide a customer service agent, and may also include the contextual data and user engagement data associated with the user. As such, the notification may include information relating to recent or upcoming life events and/or pages recently visited by the user. In response to the notification, the user may receive a call (or other communication, such as an email or text message, or other real-time communication channel) from a customer support agent at the alternative device. A block diagram 500 illustrating this interaction between the user, the ATM, the alternative device, the user interaction contextualization system 110, and the customer support system is shown in FIG. 5.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

The invention claimed is:

1. A user interaction contextualization system, comprising:
   at least one processor;
   a communication interface; and
   memory storing computer-readable instructions that, when executed by the at least one processor, cause the system to:
   receive, via the communication interface, a notification from a mobile application installed on a user device, wherein the user device is a smartphone;
   collect and analyze, by a contextual data sourcing module of the system, contextual data from a plurality of data sources via a first real-time data feed, wherein the plurality of data sources includes internal data sources, external data sources, and the user device;
   collect and analyze, by a user engagement tracking module of the system, user engagement data associated with the user device via a second real-time data feed;
   determine, by a user recapture module of the system, a likelihood of abandonment associated with the user device, based, at least in part, on the contextual data and the user engagement data; and provide, by the user recapture module via the communication interface, client-side instructions to the mobile application installed on the user device to initiate a user recapture solution, based on the likelihood of abandonment.

2. The system of claim 1, wherein the instructions, when executed by the at least one processor, further cause the system to:
provide, by the user recapture module via the communication interface, client-side instructions to the mobile application installed on the user device to prevent user interaction with at least one element displayed on a user interface of the mobile application.

3. The system of claim 1, wherein the instructions, when executed by the at least one processor, further cause the system to:
identify, by the user recapture module, a plurality of alternative pages based on an analysis of historical engagement data to determine pages visited by one or more similar users; and
provide, by the user recapture module via the communication interface, client-side instructions to the mobile application installed on the user device to display an overlay on a user interface of the mobile application, wherein the overlay includes links to the plurality of alternative pages, and wherein the overlay prevents user interaction with at least one element displayed on a user interface of the mobile application.

4. The system of claim 1, wherein the instructions, when executed by the at least one processor, further cause the system to:
determine, by a search results contextualization module of the system, a contextualized set of search results based on the contextual data and the user engagement data; and
provide, by the user recapture module via the communication interface, client-side instructions to the mobile application installed on the user device to display the contextualized set of search results.

5. The system of claim 1, wherein the instructions, when executed by the at least one processor, further cause the system to:
embed, by the user engagement tracking module, a web beacon in the client-side instructions to the mobile application installed on the user device to track user engagement data.

6. The system of claim 1, wherein, the likelihood of abandonment is further based on an analysis of historical user engagement data associated with previous similar users.

7. A user interaction contextualization system, comprising:
at least one processor;
a communication interface;
memory storing computer-readable instructions that, when executed by the at least one processor, cause the system to:
receive, via the communication interface, a notification from a user device, wherein the user device is an ATM, wherein a plurality of sensors are attached to the ATM and are in signal communication with the system;
collect and analyze, by a contextual data sourcing module of the system, contextual data from a first plurality of data sources via a first real-time data feed, wherein the first plurality of data sources includes internal data sources, external data sources, and the user device;
collect and analyze, by a user engagement tracking module of the system, user engagement data from a second plurality of data sources via a second real-time data feed, wherein the second plurality of data sources includes a camera, a motion sensor, a presence sensor and a pressure sensor;
determine, by a user recapture module of the system, a likelihood of abandonment associated with the user device, based, at least in part, on the contextual data and the user engagement data; and
provide, by the user recapture module via the communication interface, client-side instructions to the user device to initiate a user recapture solution, based on the likelihood of abandonment.

8. The system of claim 7, wherein the instructions, when executed by the at least one processor, further cause the system to:
provide, by the user recapture module via the communication interface, client-side instructions to the user device to prevent user interaction with at least one element displayed on a user interface of the user device.

9. The system of claim 7, wherein the instructions, when executed by the at least one processor, further cause the system to:
identify, by the user recapture module, a plurality of alternative pages based on an analysis of historical engagement data to determine pages visited by similar users; and
provide, by the user recapture module via the communication interface, client-side instructions to the user device to display an overlay on a user interface of the user device, wherein the overlay includes links to the plurality of alternative pages, and wherein the overlay prevents user interaction with at least one element displayed on a user interface of the user device.

10. The system of claim 7, wherein the instructions, when executed by the at least one processor, further cause the system to:
determine, by a search results contextualization module of the system, a contextualized set of search results based on the contextual data and the user engagement data; and
provide, by the user recapture module via the communication interface, client-side instructions to the user device to display the contextualized set of search results.

11. The system of claim 7, wherein the instructions, when executed by the at least one processor, further cause the system to:
issue, by the user recapture module, a push notification to an alternate device within a threshold radius from the user device, wherein the alternative device is not engaged in an online banking session, and wherein the alternate device is activated upon receipt of the push notification.

12. The system of claim 11, wherein the push notification includes a contextualized set of help topics.

13. The system of claim 11, wherein the push notification includes location information relating to at least one nearby bank branch.

14. The system of claim 7, wherein the instructions, when executed by the at least one processor, further cause the system to:
issue, by the user recapture module, a notification to a customer support system, wherein the notification includes the likelihood of abandonment associated with the user device, the contextual data, the user engagement data, and a request to provide a customer service agent; and initiate, by the user recapture module, a real-time communication channel between the customer service agent and an alternative device within a threshold radius from the user device.

15. A computer-assisted method of providing contextualized user recapture solutions comprising:

receiving, via a communication interface of a user interaction contextualization system, a notification from a mobile application installed on a user device, wherein the user device is a smartphone;

collecting and analyzing, by a contextual data sourcing module of the of the user interaction contextualization system, contextual data from a plurality of data sources via a first real-time data feed, wherein the plurality of data sources includes internal data sources, external data sources, and the user device;

collecting and analyzing, by a user engagement tracking module of the of the user interaction contextualization system, user engagement data associated with the user device via a second real-time data feed;

determining, by a user recapture module of the of the user interaction contextualization system, a likelihood of abandonment associated with the user device, based, at least in part, on the contextual data and the user engagement data; and providing, by the user recapture module via the communication interface, client-side instructions to the mobile application installed on the user device to initiate a user recapture solution, based on the likelihood of abandonment.

16. The computer-assisted method of claim 15 further comprising:

providing, by the user recapture module via the communication interface, client-side instructions to the mobile application installed on the user device to prevent user interaction with at least one element displayed on a user interface of the mobile application.

17. The computer-assisted method of claim 15 further comprising:

identifying, by the user recapture module, a plurality of alternative pages based on an analysis of historical engagement data to determine pages visited by similar users; and providing, by the user recapture module via the communication interface, client-side instructions to the mobile application installed on the user device to display an overlay on a user interface of the mobile application, wherein the overlay includes links to the plurality of alternative pages, and wherein the overlay prevents user interaction with at least one element displayed on a user interface of the mobile application.

18. The computer-assisted method of claim 15 further comprising:

determining, by a search results contextualization module of the system, a contextualized set of search results based on the contextual data and the user engagement data; and providing, by the user recapture module via the communication interface, client-side instructions to the mobile application installed on the user device to display the contextualized set of search results.

19. The computer-assisted method of claim 15 further comprising:

embedding, by the user engagement tracking module, a web beacon in the client-side instructions to the mobile application installed on the user device to track user engagement data.

20. The computer-assisted method of claim 15, wherein, the likelihood of abandonment is further based on an analysis of historical user engagement data associated with previous similar users.

* * * * *